(12) United States Patent
McDonald et al.

(10) Patent No.: US 7,711,219 B2
(45) Date of Patent: May 4, 2010

(54) THERMALLY TUNABLE OPTICAL DISPERSION COMPENSATION DEVICES

(75) Inventors: Mark McDonald, Milpitas, CA (US); Andrew Daiber, Emerald Hills, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 12/072,324

(22) Filed: Feb. 25, 2008

(65) Prior Publication Data

US 2008/0181552 A1 Jul. 31, 2008

Related U.S. Application Data

(63) Continuation of application No. 11/395,887, filed on Mar. 31, 2006, now Pat. No. 7,403,679.

(51) Int. Cl.
*G02B 6/26* (2006.01)
*G02B 6/42* (2006.01)
*G02B 6/10* (2006.01)

(52) U.S. Cl. .............................. 385/27; 385/47; 385/89; 385/129; 385/130; 385/131

(58) Field of Classification Search .................. 385/27, 385/47, 89, 129–131; 359/288, 337.5
See application file for complete search history.

(56) References Cited

U.S. PATENT DOCUMENTS

| | | | |
|---|---|---|---|
| 6,081,379 A | 6/2000 | Austin et al. | |
| 6,289,151 B1 * | 9/2001 | Kazarinov et al. | 385/32 |
| 6,411,752 B1 * | 6/2002 | Little et al. | 385/17 |
| 6,487,342 B1 | 11/2002 | Wu et al. | |
| 6,552,856 B1 | 4/2003 | Chen | |
| 6,606,182 B2 | 8/2003 | Gu | |
| 6,704,332 B2 | 3/2004 | Chapman et al. | |
| 6,724,797 B2 | 4/2004 | Daiber | |
| 6,748,140 B1 | 6/2004 | Wu et al. | |
| 6,765,679 B2 | 7/2004 | Ducellier et al. | |
| 6,776,493 B1 | 8/2004 | Kuzma | |
| 6,809,865 B2 | 10/2004 | Chen | |
| 6,844,975 B2 | 1/2005 | Sargent et al. | |
| 6,853,654 B2 | 2/2005 | McDonald et al. | |
| 6,888,986 B2 | 5/2005 | Ovadia et al. | |

(Continued)

OTHER PUBLICATIONS

"PCT/US2007/064726", *International Search Report*, (Aug. 21, 2007), 2 pages.

(Continued)

*Primary Examiner*—Frank G Font
*Assistant Examiner*—Mary A El Shammaa
(74) *Attorney, Agent, or Firm*—Blakely, Sokoloff, Taylor & Zafman LLP

(57) ABSTRACT

Thermally tunable optical dispersion compensation (ODC) devices are disclosed. In one aspect, an ODC device may include multiple Gires-Tournois (G-T) etalons. The etalons may be optically coupled together. The etalons may compensate for optical dispersion by collectively delaying light. At least one of the G-T etalons may have a temperature dependent partial reflector. The ODC device may also include at least one thermal device to change the temperature of the G-T etalon having the temperature dependent partial reflector. Methods of making and using the ODC devices are also disclosed, as well as various systems including the ODC devices.

18 Claims, 20 Drawing Sheets

U.S. PATENT DOCUMENTS

| | | | |
|---|---|---|---|
| 6,920,253 | B2 | 7/2005 | Tan et al. |
| 7,035,495 | B2 * | 4/2006 | Takahashi et al. ............. 385/15 |
| 7,058,258 | B2 * | 6/2006 | Yamazaki .................... 385/27 |
| 7,061,659 | B2 | 6/2006 | Ling et al. |
| 7,072,546 | B2 | 7/2006 | Nikonov et al. |
| 7,221,827 | B2 | 5/2007 | Domash et al. |
| 7,277,617 | B2 | 10/2007 | Bhowmik |
| 7,403,679 | B2 | 7/2008 | McDonald et al. |
| 2003/0090806 | A1 | 5/2003 | Chen |
| 2003/0095261 | A1 | 5/2003 | Gu |
| 2003/0099019 | A1 | 5/2003 | Zhang et al. |
| 2004/0070833 | A1 | 4/2004 | Sargent et al. |
| 2005/0071499 | A1 | 3/2005 | Batra et al. |
| 2005/0074206 | A1 | 4/2005 | Domash et al. |
| 2005/0123008 | A1 | 6/2005 | Daiber et al. |
| 2007/0002926 | A1 | 1/2007 | McDonald et al. |
| 2007/0154225 | A1 | 7/2007 | Schulz et al. |
| 2007/0196111 | A1 | 8/2007 | Shang |
| 2008/0181552 | A1 | 7/2008 | McDonald et al. |

OTHER PUBLICATIONS

"PCT/US2007/064729", *Interrnational Search Report*, (Aug. 21, 2007), 2 pages.

CIVCOM.COM, "Free-Light Family—Widely Tunable Transponders", www.civcom.com/Technology/free_light.htm, (2003-2005), 5 pages.

CIVCOM.COM, "Free-Path—Tunable Optical Dispersion Compensation, GLASSIC-TODC-10" www.civcom.com/Technology/glassic.htm, (2003-2005), 2 pages.

Intel Corporation, "10Gb/s Optical Transceivers; Fundamentals and Emerging Technologies", *Intel Technology Journal, Optical Technologies and Applications*, vol. 8, Issue 2, ISSN 1535-864X, (May 10, 2005), pp. 83-100.

Intel Corporation, "10Gbps C-Band and L-Band Tunable Optical Transceivers for DWDM Networks", *Intel TXN13600 Product Brief*, (2004), 4 pages.

Intel Corporation, "Automated Optical Packaging Technoligy for 10 Gb/s Transceivers and its Application to a Low-Cost Full C-Band Tunable Transmitter", *Intel Technology Journal, Optical Technolgies and Applications*, vol. 8, Issue 2, ISSN 1535-864X, (May 10, 2004), pp. 101-114.

Intel Corporation, "Silicon Photonics", *Intel Technology Journal, Optical Technologies and Applications*, vol. 8, Issue 2, ISSN 1535-864X, (May 10, 2004), pp. 144-160.

LIGHTREADING.COM, "Avanex Ships Dispersion Compensator", www.lightreading.com/document.asp?doc_id=52615, (Mar. 11, 2004), 4 pages.

Vakoc, B. J., et al., "A Tunable Dispersion Compensator Comprised of Cascaded Single-Cavity Etalons", *IEEE Photonics Technology Letters*, vol. 17, No. 5, (May 2005), pp. 1043-1045.

"Written Opinion", PCT/US2007/064726, (Oct. 9, 2008), 6 pages.

Notice of Allowance for U.S. Appl. No. 11/395,729, mailed Jul. 2, 2009, 13 pgs.

* cited by examiner

THERMALLY TUNABLE OPTICAL DISPERSION COMPENSATION DEVICES

CROSS-REFERENCE TO RELATED APPLICATION

The present application is a continuation of U.S. patent application Ser. No. 11/395,887, filed on Mar. 31, 2006 now U.S. Pat. No. 7,403,679, entitled "Thermally Tunable Optical Dispersion Compensation Devices," which is hereby incorporated herein by reference. The specification of this patent application is similar to the specification of U.S. patent application Ser. No. 11/395,729, filed Mar. 31, 2006, entitled "THERMALLY TUNABLE OPTICAL DISPERSION COMPENSATION DEVICES."

BACKGROUND

1. Field

Embodiments of the invention relate to the field of optical communications. In particular, one or more embodiments of the invention relate to optical dispersion compensation.

2. Background Information

Optical dispersion may occur in optical fiber and other optical materials. A common source of dispersion in optical fibers is chromatic dispersion (CD).

Chromatic dispersion may occur due to the speed of light being dependent on the refractive index of the medium within which the light is propagating. In many materials that may be used for optical fibers, the refractive index may vary with the wavelength of the light. As a result, light with different wavelengths may be transmitted through the optical fiber at slightly different speeds. This may result in the different wavelengths of light of a transmitted pulse to spread out or disperse over time and length of transmission. Such dispersion is generally undesirable.

Various approaches for reducing optical dispersion in fibers are known in the arts. One approach includes using a dispersion compensating fiber. However, dispersion compensating fibers may tend to costly or have increased optical loss. Another approach includes using electronic dispersion compensation. However, there are known disadvantages associated with electronic dispersion compensation, such as, for example, in some cases physical size or power consumption.

Optical dispersion compensation is yet another approach that may be used.

BRIEF DESCRIPTION OF THE SEVERAL VIEWS OF THE DRAWINGS

The invention may best be understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

I. Optical Receiver Having ODC Device

Figure 1:
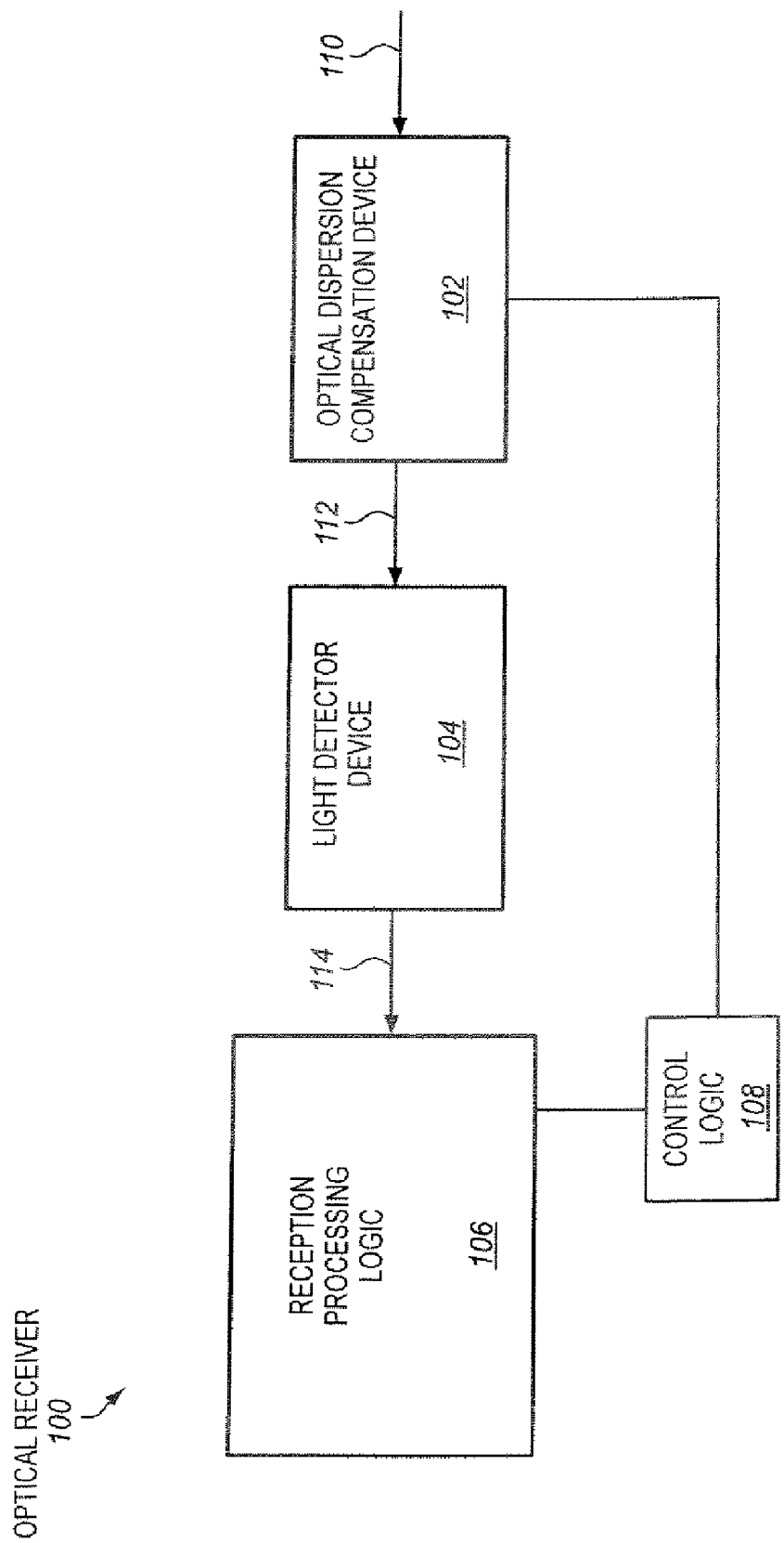
FIG. 1 is a block diagram of an optical receiver including an optical dispersion compensation (ODC) device, according to one or more embodiments of the invention.

FIG. 1 is a block diagram of an optical receiver 100 including an optical dispersion compensation (ODC) device 102, according to one or more embodiments of the invention. The optical receiver also includes a light detector device 104, a reception processing logic 106, and control logic 108.

Dispersed light 110, for example due in part to chromatic dispersion, may be input to the ODC device. By way of example, the ODC device may be capable of being optically coupled with an optical fiber, embedded waveguide, or other source of the dispersed light. The ODC device may optically compensate for or reduce the amount of dispersion of the light. As used herein, compensating for optical dispersion does not require full compensation or compensating to any level but merely reducing optical dispersion by a sufficient amount for the particular implementation. Various ODC device embodiments will be discussed in further detail below. The ODC device may provide dispersion compensated light 112 having reduced dispersion as output.

The light detector device may be optically coupled with the output of the ODC device and may receive the dispersion compensated light. The light detector device may detect the received dispersion compensated light. The light detector device may convert the received light to a corresponding output electrical signal 114, such as, for example, an electrical current. Examples of suitable light detector devices include, but are not limited to, indium phosphide (InP) and gallium arsenide (GaAs) PIN (Positive-Intrinsic-Negative doped structure) photodiodes, and InP avalanche photodiodes (APD), although the scope of the invention is not limited to just these particular light detector devices.

The reception processing logic may be electrically coupled with the output of the light detector device. The reception processing logic may include hardware, such as, for example, a circuit, software, firmware, or a combination thereof. The reception processing logic may processes the electrical signals corresponding to the received dispersion compensated light. By way of example, the reception processing logic may include a DMUX/CDR (Demultiplexer/Clock Data Recovery) circuit. The DMUX/CDR circuit may include a demultiplexer with built in CDR circuit. However, the scope of the invention is not limited to this particular type of reception logic. In one or more embodiments of the invention, the logic may include error correction logic to correct errors in the received data. In one or more embodiments of the invention, the error correction logic may generate an error metric, such as, for example, a bit error rate (BER) corresponding to the previously dispersion compensated signals, and may provide the error metric to the control logic.

The control logic may be coupled with the reception processing logic and the ODC device. In one or more embodiments of the invention, the control logic may receive the BER or other error metric from the reception processing logic, and may tune, or control, or otherwise adjust the ODC device based, at least in part, on the BER or other error metric. In one or more embodiments of the invention, a feedback loop may be used to tune or otherwise adjust the ODC device based on the error metric in order to adjust the amount of optical dispersion compensation, although this is not required. A high BER may indicate that the device may not be optimally tuned, and tuning may accordingly be performed to better tune the device and reduce the BER. In one or more embodiments of the invention, tuning the ODC device may include controlling one or more temperatures of the ODC device in order to provide an optical dispersion compensation having particular characteristics. The ODC device may also or alternatively optionally be controlled based on other information. Such auto tuning or adjustment may potentially be advantageous in certain implementations, such as, for example, in add-drop networks where the transmission distance of the received optical signal may be unknown, or where the amount of introduced optical dispersion may be otherwise variable or unknown.

II. Introduction to Etalons

In one or more embodiments of the invention, etalons may be used for optical dispersion compensation, although the scope of the invention is not limited in this respect. An etalon may include an optical device having two or more generally flat, parallel, reflecting surfaces. The reflecting surfaces may be located at opposite ends of an optical cavity that may include a transparent solid, gas, or vacuum. Light may reflect back and forth between the reflective surfaces. Resonance may occur in the etalon at certain frequencies based on interference of light, which may depend upon the thickness of and optical properties of the cavity. The etalon may be used for optical compensation.

Figure 2A:
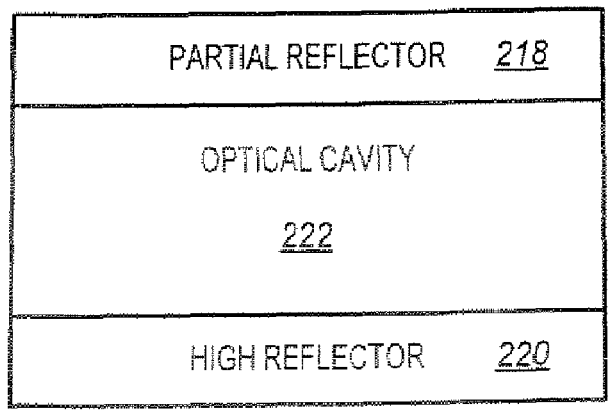
FIG. 2A is a block diagram of a cross-sectional view of a G-T etalon, according to one or more embodiments of the invention.

One example of a suitable type of etalon is a Gires-Tournois (G-T) etalon, although the scope of the invention is not limited to G-T etalons. G-T etalons are a type of optical all-pass resonant filter. Other types of all pass resonant filters may also optionally be employed in alternate embodiments of the invention. FIG. 2A is a block diagram of a cross-sectional view of a G-T etalon 216, according to one or more embodiments of the invention. The G-T etalon includes two or more reflectors 218, 220 separated by an optical cavity 222. In particular, the G-T etalon includes a partial reflector 218 and a high reflector 220 on opposite sides of the optical cavity.

The partial reflector has a significantly lower reflectance than the high reflector. By way of example, the partial reflector may have a reflectance in the range of about 10 to 70%, or about 20 to 60%, for example, and the high reflector may have a reflectance that may be greater than 90%, or may be greater than 95%, or may be greater than 99%, depending upon the particular implementation. For clarity, as used herein, a "partial reflector" has a reflectivity that is less than 70%, and a "high reflector" has a reflectivity that is greater than 90%". The reflectivity of the high reflector may approach total reflectivity.

By way of example, the reflectors may include one or more reflective surfaces. Suitable reflective surfaces include, but are not limited to, those provided by reflective single layers, such as, for example highly reflective metal layers, and those provided by stacked layers, such as, for example, dielectric stacks. Suitable highly reflective metal layers include, but are not limited to, gold and silver layers. The dielectric stacks may include multiple layers of materials that have different indexes of refraction. In one particular embodiment of the invention, the high reflector may be a gold layer, and the partial reflector may be a dielectric stack of silicon and silicon dioxide, although the scope of the invention is not so limited.

The optical cavity may be disposed between the reflectors. The optical cavity may include a solid, a gas, or a vacuum. In one or more embodiments of the invention, the optical cavity may include crystalline silicon, such as, for example, single crystal silicon, although the scope of the invention is not limited in this respect. The use of crystalline silicon may offer certain potential advantages in some implementations, which will be explained in further detail below.

Light may be delayed in a G-T etalon when a frequency of incident light is near a resonance frequency of the G-T etalon. The resonant frequency may occur when the optical path length is around (q)(lambda)/2, where q is an integer, and lambda represents the wavelength of light measured inside the etalon material.

Figure 2B:
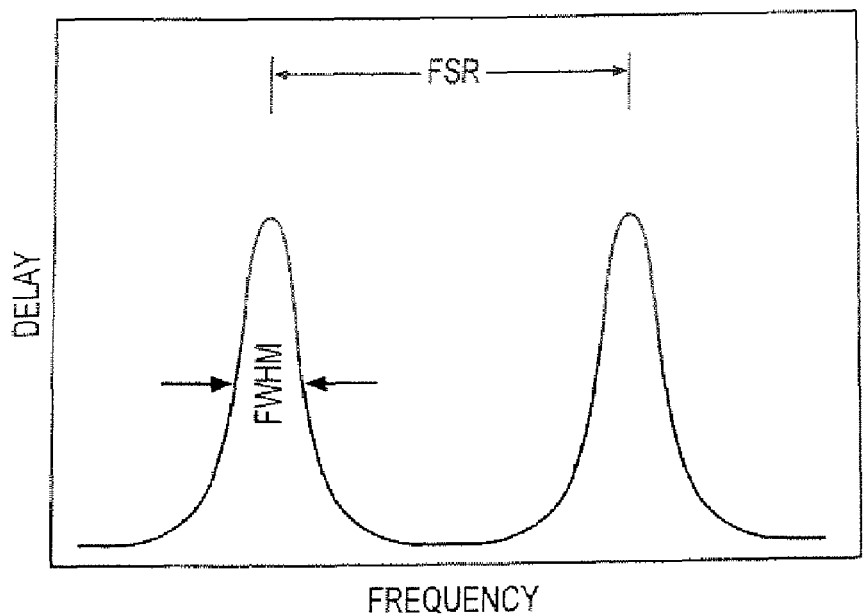
FIG. 2B is an exemplary plot of delay versus frequency for an example G-T etalon.

FIG. 2B shows a plot of delay versus frequency for an example G-T etalon. Two delay curves are shown. As shown, each of the delay curves has a shape that is substantially Lorentzian. Each of the delay curves has a peak or maximum delay. As shown, the delay due to a G-T etalon may be a function of frequency. In one or more embodiments of the invention, such delay may be used to compensate for optical dispersion.

The full-width half max (FWHM) of the etalon measures the width of a curve. The FWHM may be largely based on the partial reflectivity of the etalon.

The free spectral range (FSR) of a G-T etalon represents the distance in frequency space between adjacent peaks. The FSR may be based on the optical path length through the optical cavity, or the spacing between the reflectors, and the index of refraction of the optical cavity. The FSR of a G-T etalon may be adjusted by adjusting the spacing between the reflectors, the index of refraction of the optical cavity, or both. Each resonant mode of the etalon may occur at an integer multiple of a half wavelength. In certain optical communication protocols channels may be spaced apart by an FSR of about 50 GHz. By way of example, a 3 mm optical path length of air or a 1 mm optical path length of silicon may provide such a 50 GHz FSR.

Etalons may be optically tuned or adjusted by tuning or adjusting their temperature. The change in temperature may result in a corresponding change in material thickness, material refractive index, or some combination. If the temperature change is sufficient, a peak or maximum delay may be translated in the frequency domain one full period or mode.

In one or more embodiments of the invention, change in temperature may also change reflectivity. Accordingly, thermal tuning may be used to change FWHM of etalons.

III. First Exemplary ODC Device Design

Figure 3:
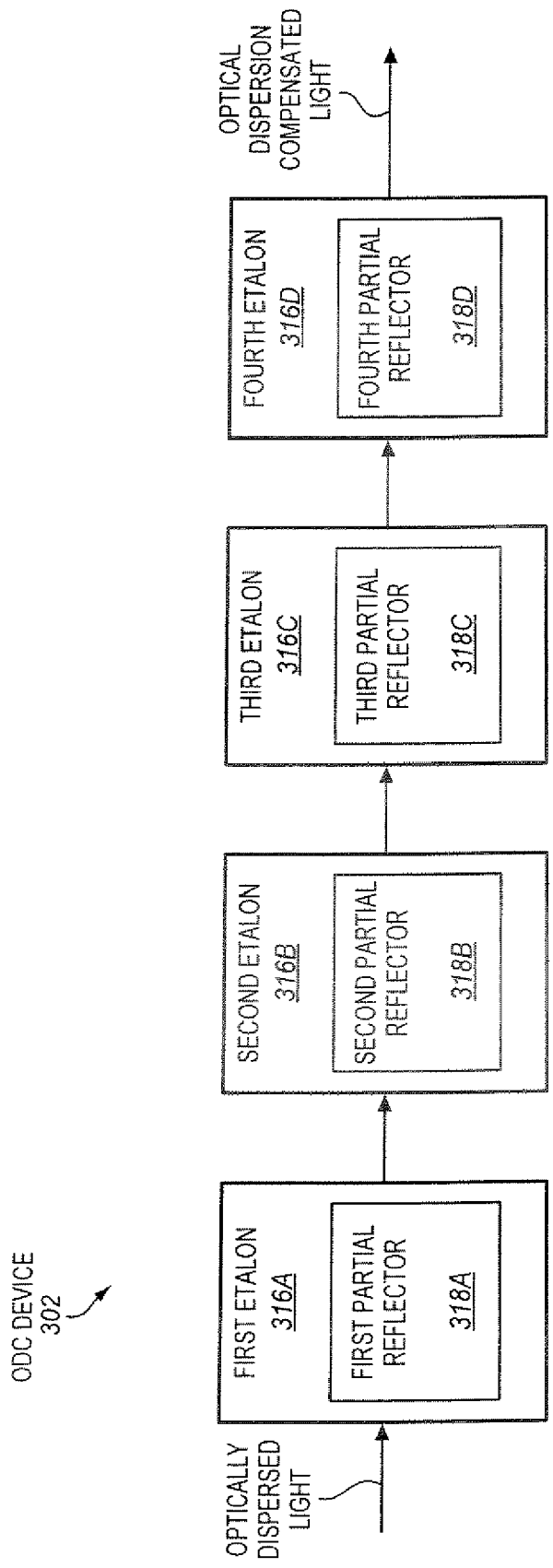
FIG. 3 is a block diagram of an ODC device, according to one or more embodiments of the invention.

In one or more embodiments of the invention, a delay provided by a G-T etalon may be used to compensate for or reduce optical dispersion. FIG. 3 is a block diagram of an ODC device 302, according to one or more embodiments of the invention. The ODC device includes two or more (a plurality) of etalons 316A-D optically coupled together, such as, for example, in series. The etalons may compensate for optical dispersion by collectively delaying light. In one or more embodiments of the invention, the etalons may include G-T etalons, although the scope of the invention is not limited in this respect.

In particular, the illustrated ODC device includes a first G-T etalon 316A, a second G-T etalon 316B, a third G-T etalon 316C, and a fourth G-T etalon 316D, although the scope of the invention is not limited in this respect. In alternate embodiments of the invention either fewer or more etalons may optionally be included. The etalons may optionally have some or all of the characteristics of the etalons discussed elsewhere herein. For brevity, and to avoid obscuring the description, the discussion tends to emphasize different and/or additional characteristics.

The first G-T etalon has a first partial reflector 318A, the second G-T etalon has a second partial reflector 318B, the third G-T etalon has a third partial reflector 318C, and the fourth G-T etalon has a fourth partial reflector 318D. In one or more embodiments of the invention, the partial reflectors of the etalons may all have different reflectivities, although this is not required. The reflectivities of the etalons may be made different by using reflectors having different materials, thicknesses, or numbers of stacked layers, for example. The different reflectivities may give the etalons different delay response curves characterized by different peak delays and different FWHM. That is, the etalons may all have different FWHM and different peak delays, although this is not required. As will be explained in further detail below, the different FWHM and different peak delays may help to allow the sum of the delays of the etalons to approximate a linear delay response in frequency domain.

The ODC device also includes one or more thermal devices or temperature control devices (not shown). In one or more embodiments of the invention, one or more or each of the etalons may be separately cooled and/or heated. For example, one or more separate dedicated thermal devices or temperature control devices, such as, for example, a thermoelectric controller (TEC), resistive heater, and/or thermo-electric cooler, may be included for one or more or each of the etalons. This may allow the etalons to be cooled and/or heated to different temperatures. Alternatively, two or more or all of the etalons may be cooled and/or heated to the same or similar temperature with a common heating and/or cooling device. In one or more embodiments of the invention, one or more or all of the reflectivities of the etalons may be temperature dependent, although this is not required. As will be explained in further detail below, the temperature dependent reflectivities may allow for different amounts of dispersion to be compensated for.

Other aspects of the design of the etalons, such as, for example, the high reflectors and the optical cavity thicknesses, may optionally be the same or similar, although the scope of the invention is not limited in this respect. This may potentially help to simplify fabrication.

Figure 4:
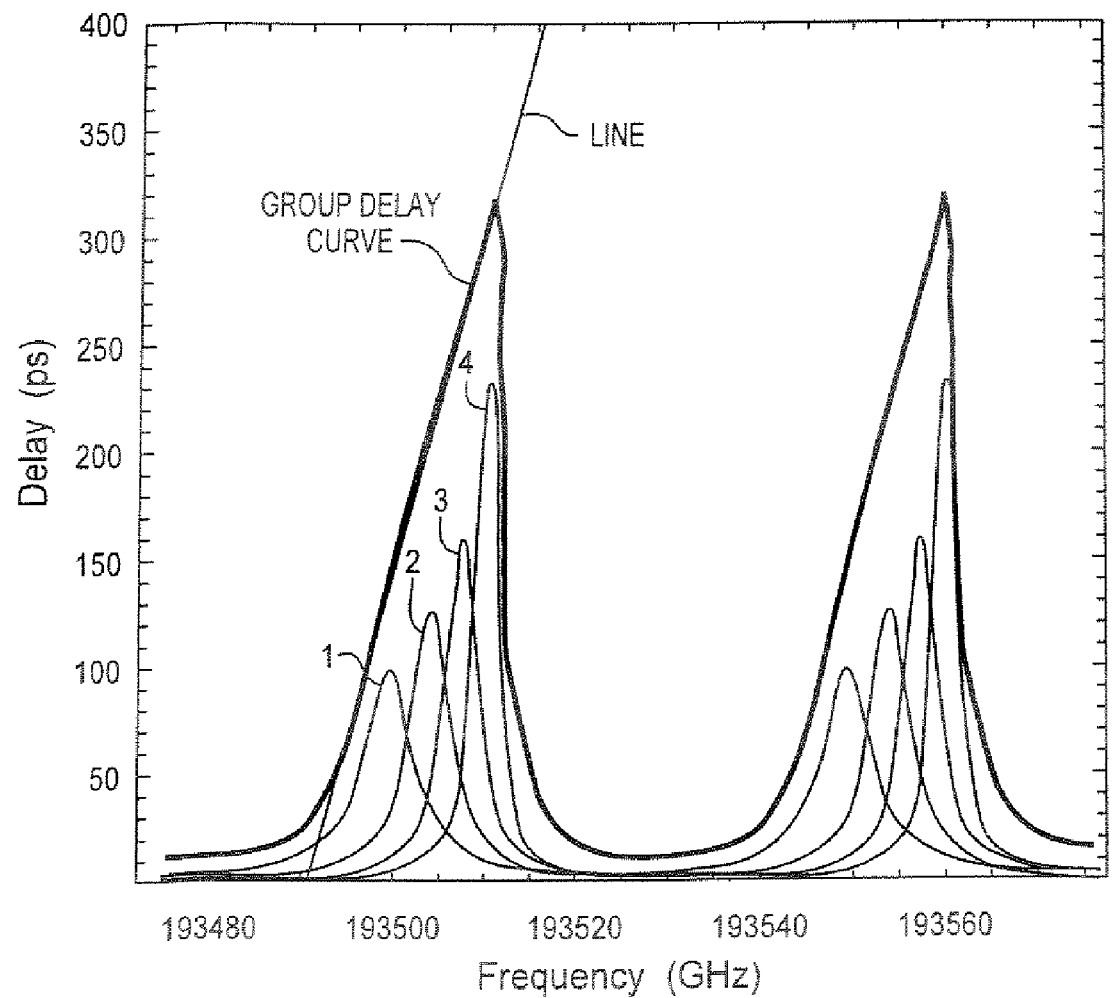
FIG. 4 is a plot showing how the ODC device of FIG. 3 may compensate for optical dispersion, according to one or more embodiments of the invention.

IV. Plot Showing Compensation for Optical Dispersion with First Exemplary ODC Device Design FIG. 4 is a plot showing how the ODC device of FIG. 3 may compensate for optical dispersion, according to one or more embodiments of the invention. The plot shows delay in picoseconds (ps) plotted on the y-axis against frequency in gigahertz (GHz) on the x-axis.

A straight line (labeled "line") represents the amount of optical dispersion compensation that would undo the amount of optical dispersion introduced by an optical fiber. In some optical fibers, the amount of optical dispersion introduced varies approximately linearly with frequency of light. The particular illustrated straight line has an optical dispersion slope of about 2000 ps/nm and may be sufficient to represent the amount of optical dispersion for particular optical fibers, but not all optical fibers.

Four different delay curves labeled 1, 2, 3, and 4, each represent a delay versus frequency response curve for a different one of the four G-T etalons. The shapes of the delay curves are substantially Lorentzian. A smaller FWHM may tend to lead to a higher peak delay. As shown, each of the curves has a different center frequency or peak or maximum delay. That is, the center frequencies or peaks of the four different delay curves are shifted in frequency. In one or more embodiments of the invention, the shift of the center frequency may be due at least in part to a phase shift of light, such as, for example, due to a difference in thickness of a phase adjustment or spacer layer which may optionally be part of a reflective dielectric stack and which may help to adjust both reflection amplitude and phase to suitable values, although this is not required. The distance between the peaks of the two curves labeled "1" represents the FSR for the corresponding etalon.

A group delay curve (labeled "group delay curve") representing the sum of the four different delay curves is also shown. As shown, the group delay curve has an approximately linear shape that closely approximates the straight line that is used to represent the expected level of optical dispersion in the optical fiber. The group delay curve represents the combined effect of the four different G-T etalons and may be used to compensate for or reduce the optical dispersion.

This is just one example. The scope of the invention is not limited to just this one example. In alternate embodiments of the invention, the etalons may optionally be based on different bandwidths. For example, instead of a bandwidth of about 20 GHz, the etalons may be based on a bandwidth of about 15 GHz, or a bandwidth of about 10 GHz, to name just a few examples. Simulations with 10, 15, and 20 GHz ODC devices seem to indicate that the group delay curve may more closely approximate the straight line representing optical dispersion with decreasing bandwidths.

In still further alternate embodiments of the invention, different numbers of etalons may optionally be included in an ODC device. For example, instead of four etalons the ODC device may include five or six etalons, to name just a few examples. Simulations with 4, 5, and 6 etalon ODC devices seem to indicate that the group delay curve may more closely approximate the straight line representing optical dispersion with increasing numbers of etalons.

V. Changing Dispersion Slope

Figure 5:
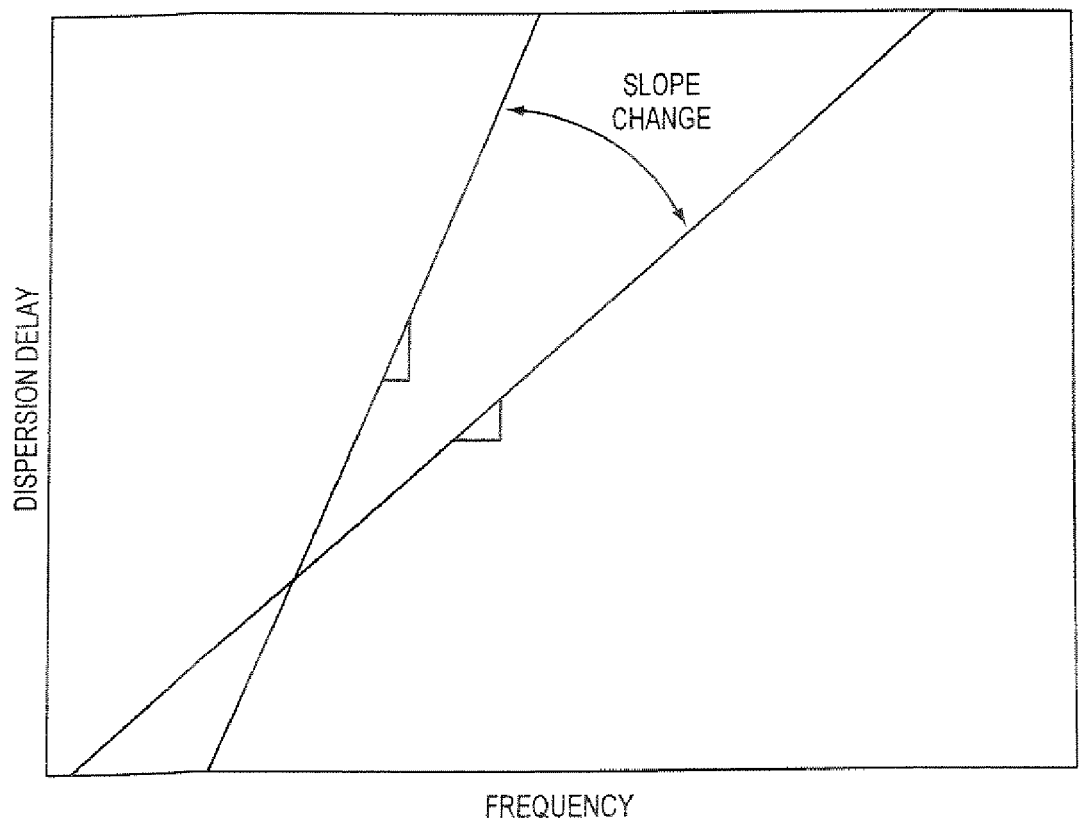
FIG. 5 is a plot showing that the amount of optical dispersion compensation may vary from one implementation to another.

FIG. 5 is a plot showing that the slope of the straight line representing the amount of optical dispersion compensation that would undue the optical dispersion introduced by an optical fiber may vary from one implementation to another. The plot shows delay on the y-axis against frequency on the x-axis. Two straight lines are shown. The different straight lines have different slopes when plotted as delay versus frequency. The different slopes may represent different amounts of optical dispersion compensation to undue introduced optical dispersion. The amount of introduced optical dispersion may vary due to various factors, such as, for example, differences in fiber material, condition of the fiber, whether or not dispersion compensating fiber is used, whether or not optical dispersion pre-compensation has been performed, and the like. In some cases, the slope may even be approximately zero or even negative. Since the slope may vary, it may be advantageous in some implementations to be able to adjust or tune an ODC device so that the group delay curve representing the combined delay response of the etalons may approximate lines having different slopes. This may help to allow a single ODC device to compensate for various types of optical dispersion.

VI. Etalon Having Temperature Dependent Reflector

Figure 6:
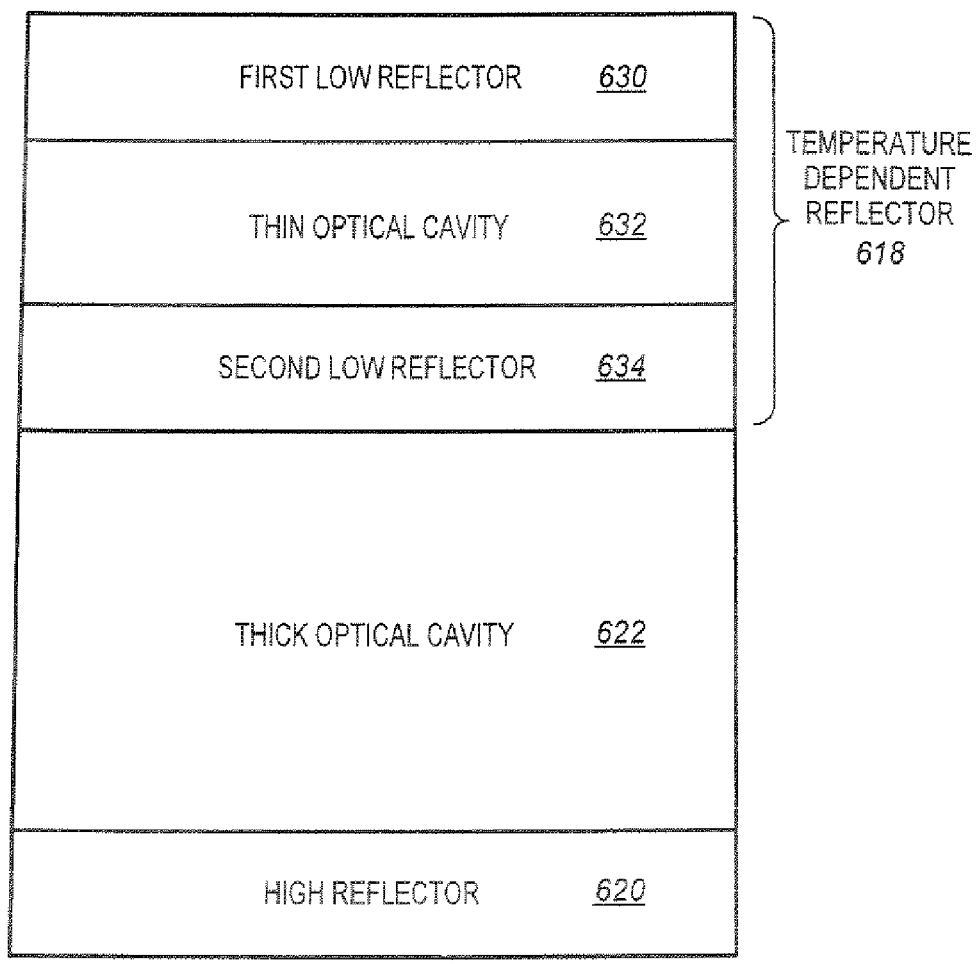
FIG. 6A is a block diagram of a cross-sectional view of a G-T etalon having a temperature dependent reflectivity, according to one or more embodiments of the invention.
FIG. 6B is a top planar block diagram view of an ODC device including ring resonators microfabricated on a substrate, according to one or more embodiments of the invention.

FIG. 6A is a block diagram of a cross-sectional view of a G-T etalon 616, according to one or more embodiments of the invention. The G-T etalon includes a temperature dependent partial reflector 618, a high reflector 620, and a thick optical cavity 622 disposed between the temperature dependent partial reflector and the high reflector.

The temperature dependent partial reflector itself has a structure somewhat similar to an etalon, such as, for example, a Fabry-Perot (F-P) etalon. In particular, the temperature dependent partial reflector includes a first, outer low or partial reflector 630, a second, inner low or partial reflector 634, and a thin optical cavity 632 disposed between the first and second low reflectors.

In one or more embodiments of the invention, the inner, second low reflector may have a reflectance that is greater than a reflectance of the outer, first low reflector. By way of example, and not limitation, the first low reflector may have a reflectance of about 5 to 15%, and the second low reflector may have a reflectance of about 20 to 40%, although the scope of the invention is not limited in this respect. Each of the low reflectors may include a single reflective layer or a dielectric stack, for example.

The high reflector may likewise be a single reflective layer or dielectric stack. The high reflector may have a significantly greater reflectance than the low reflectors. By way of example, the high reflector may have a reflectance of at least 90%, at least 95%, at least 98%, or at least 99%.

The thin optical cavity may be thinner than, or otherwise have a shorter optical path length than, the thick optical cavity. By way of example, and not limitation, the thick optical cavity may have an optical path length that gives a FSR of about 50 GHz, whereas the thin optical cavity may have an optical path length that gives a FSR of about 275 GHz, although the scope of the invention is not so limited. Other FSR are also suitable. In one or more embodiments of the invention, the optical path length of the thinner optical cavity is less than half the optical thickness of the thicker optical cavity, although the scope of the invention is not so limited.

In one or more embodiments of the invention, one or more or each of the thin and thick optical cavities may include crystalline silicon, gallium arsenide, or another high index material, although the scope of the invention is not limited in this respect. Semiconductor materials such as silicon and gallium arsenide provide a relatively large change in refractive index with temperature and may optionally be used in the optical cavities for enhanced tuning over a relatively small range of temperature. By way of example, single crystal silicon has a thermo-optic coefficient of about 10 GHz/° C., compared to about 1 GHz/° C. for fused silica. This may allow a larger tuning range to be addressed using a smaller temperature range. For example, single crystal silicon may offer significant tuning over a relatively small temperature range of about 30° C. Significantly larger temperature ranges may be needed to achieve the same or similar tuning for materials such as fused silica. These larger temperature ranges may have drawbacks, such as, for example, increased power consumption, undesirable convective effects, and decreased reliability when components are heated and cooled repeatedly over a large range, etc. Traditionally, crystalline silicon is not commonly used in optical elements because it tends to be thermally sensitive and tends to absorb at commonly encountered wavelengths.

The thicker optical cavity may behave substantially like a G-T etalon with a high reflector and a low reflector having an effective reflectivity based on the composite reflectivity of the thinner overlying optical cavity. The temperature dependent partial reflector may be considered a Fabry-Perot (F-P) etalon. In one or more embodiments of the invention the temperature dependent partial reflector has a temperature dependent reflectivity of at least 0.01%/° C., although the scope of the invention is not so limited. The composite reflectivity of the F-P etalon may not be constant with wavelength, but may vary periodically with a period approximately equal to the FSR of the F-P cavity. This composite reflectivity F-P cavity may be thermally tuned in a manner analogous to the thermal tuning of a G-T etalon considered in isolation.

When the G-T etalon is optically coupled to the F-P cavity as shown and described here, the thermal tuning of the resulting coupled structure may be interpreted as thermal tuning of a G-T etalon where the reflectivity of the partial reflector is temperature dependent and may be thermally tuned to various different partial reflectivities. A method may include changing a temperature of the etalon to change the reflectivity of the partial reflector. Without limitation, to further illustrate certain concepts, let's consider a concrete example of an etalon having a structure similar to that shown in FIG. 6A. The thicker G-T cavity may have an FSR of about 50 GHz, the thinner F-P cavity may have an FSR of about 275 GHz, and these cavities may be fabricated from single crystal silicon, which has a thermo-optic coefficient of about 10 GHz/° C. If one observes the group delay peak at a particular wavelength as this etalon is heated, a succession of group delay peaks may sweep past the particular wavelength, with the peaks corresponding to the G-T etalon and spaced approximately every 5° C. Since the G-T cavity has a FSR of 50 GHz and a tuning rate of 10 GHz/° C., about 5° C. is the temperature spacing between the G-T cavity resonances. These peaks do not have identical FWHM. Rather, the FWHM may be based on the temperature dependent reflectivity of the F-P cavity at that particular temperature and wavelength, such that changing the temperature may include changing the FWHM. The F-P cavity may have resonances about every 275 GHz, corresponding to a thermal period of about 27.5° C. The reflectivity of the F-P cavity may vary relatively smoothly over this thermal period as the cavity is tuned out of resonance and then re-approaches the next resonance at about 27.5° C. intervals. From the G-T cavities viewpoint, the reflectivity sampled at about each 50 GHz resonance, which may be addressed by a 5° C. temperature change, may set the peak group delay of that resonance. Accordingly, there may be thermal tuning of the reflectivity in combination with the ability to thermally address the etalon's tuning period many times over. This may allow both the center frequency and the dispersion slope of the ODC device to be tuned. The scope of the invention is not limited to this particular example.

Now, other approaches for achieving temperature dependent reflectivities are also contemplated, such as, for example, using a dielectric stack with a thick layer of a high thermo-optic coefficient material, such as, for example, single crystal silicon. In one or more embodiments of the invention, the thick layer of the high thermo-optic coefficient material may have a thickness of at least 0.5 microns. The thick layer may be formed by deposition or polishing, for example. Other temperature dependent partial reflectors known in the arts are also potentially suitable.

Now, the use of G-T etalons is not required. In one or more embodiments of the invention, optical rings may be used in place of G-T etalons to delay light and compensate for optical dispersion. The optical path length around the ring may be roughly analogous to the optical path length through the optical cavity of a G-T etalon. Likewise, the effective coupling coefficient of a ring to a waveguide may be roughly analogous to a partial reflectivity of a G-T etalon.

Figure 6B:
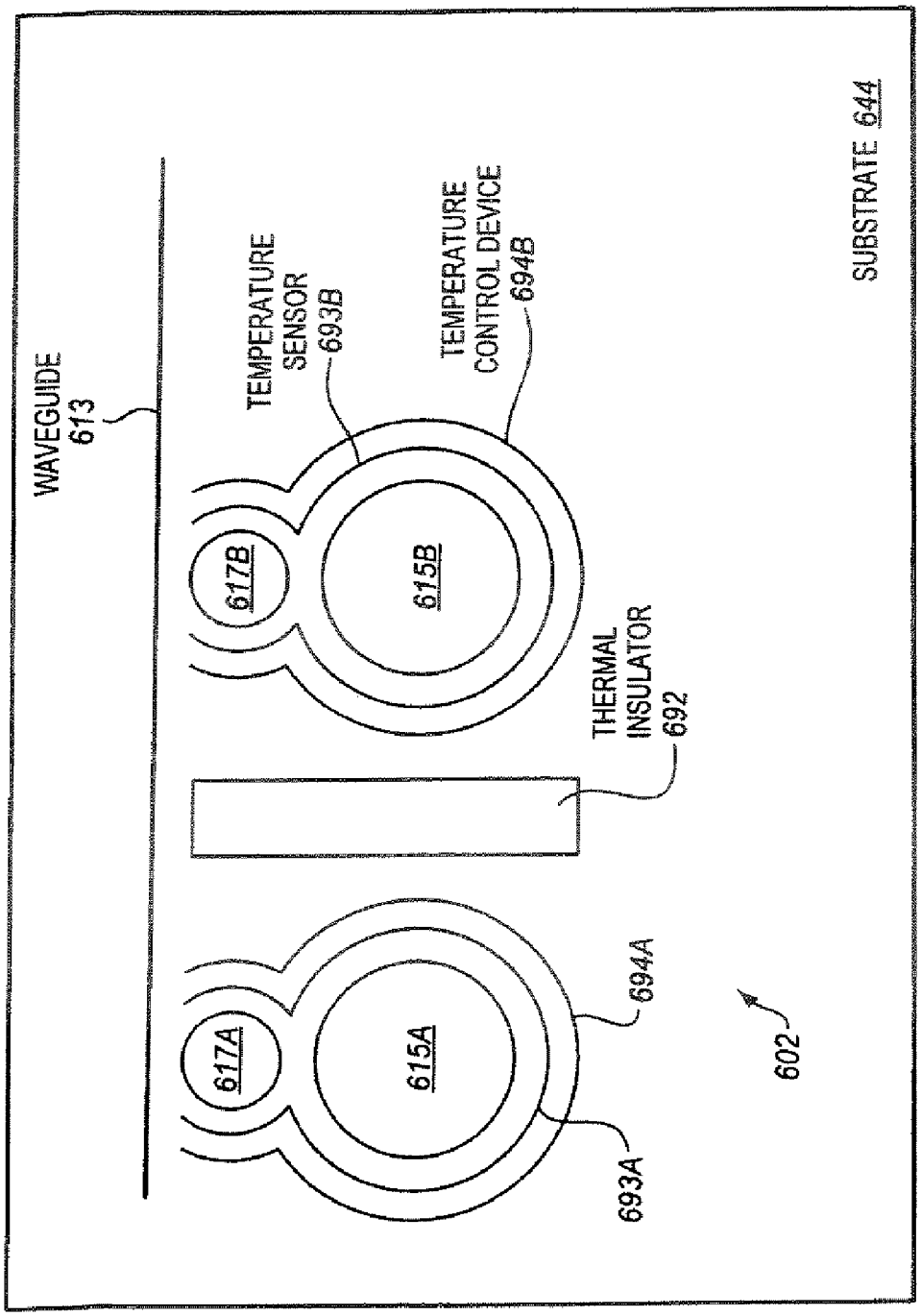

FIG. 6B is a top planar block diagram view of an ODC device 602 including ring resonators 615A-B, 617A-B microfabricated on a substrate 644, according to one or more embodiments of the invention. An embedded waveguide 613 is microfabricated in or on the substrate. Two pairs of optical rings are also microfabricated in the substrate, although fewer or more pairs of optical rings may optionally be included in alternate embodiments. The term ring does not imply circular and the rings may optionally be oval or otherwise non-circular.

A first pair includes a first smaller ring 617A and a first larger ring 615A. A second pair includes a second smaller ring 617B and a second larger ring 615B. Each of the smaller rings may be evanescently or otherwise optically coupled with the waveguide, and the rings within each of the pairs may be evanescently or otherwise optically coupled together. The amount of optical coupling may be based at least in part on separation distance, and may also be based at least in part on a coupling length. Generally, the smaller the separation distance and the larger the coupling length, the greater the optical coupling.

In one or more embodiments of the invention, the smaller optical rings may be optically coupled to the waveguide with different amounts of optical coupling. For example, in one or more embodiments of the invention, different separation distances and/or different coupling lengths may be used for the smaller optical rings. By way of example, as shown in the illustrated embodiment, one or more of the optical rings may be elongated or oval in the direction of the waveguide in order to increase the coupling length with the waveguide.

The smaller rings may provide temperature dependent effective coupling coefficients to their corresponding larger rings. These different effective coupling coefficients may be used in roughly an analogous way as temperature dependent partial reflectivities to compensate for different amounts of optical dispersion.

The illustrated ODC device includes an optional first monolithically integrated temperature sensor 693A for the first pair of rings, and an optional second monolithically integrated temperature sensor 693B for the second pair of rings. The illustrated ODC device also includes an optional first monolithically integrated temperature control device 694A, such as, for example, a resistive heater, for the first pair of rings, and an optional second monolithically integrated temperature control device 694B for the second pair of rings. As shown, the temperature sensors and temperature control devices may optionally be fabricated in close proximity of the rings, and may optionally conform in shape to the rings. As shown, an optional thermal insulator 692, such as, for example, an inorganic or organic insulator, may be disposed between the pairs of rings to thermally insulate the pairs of rings from one another.

Figure 7A:
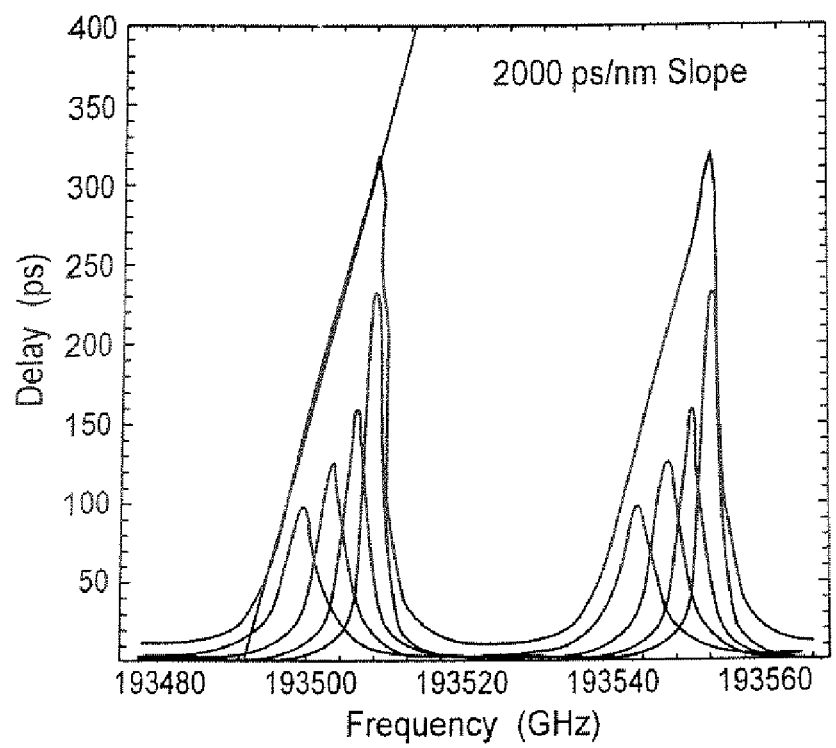
FIGS. 7A-B are plots showing how an ODC device similar to that shown in FIG. 3 having etalons similar to those shown in FIG. 6A with temperature dependent partial reflectors may compensate for varying amounts of optical dispersion, according to one or more embodiments of the invention.
Figure 7B:
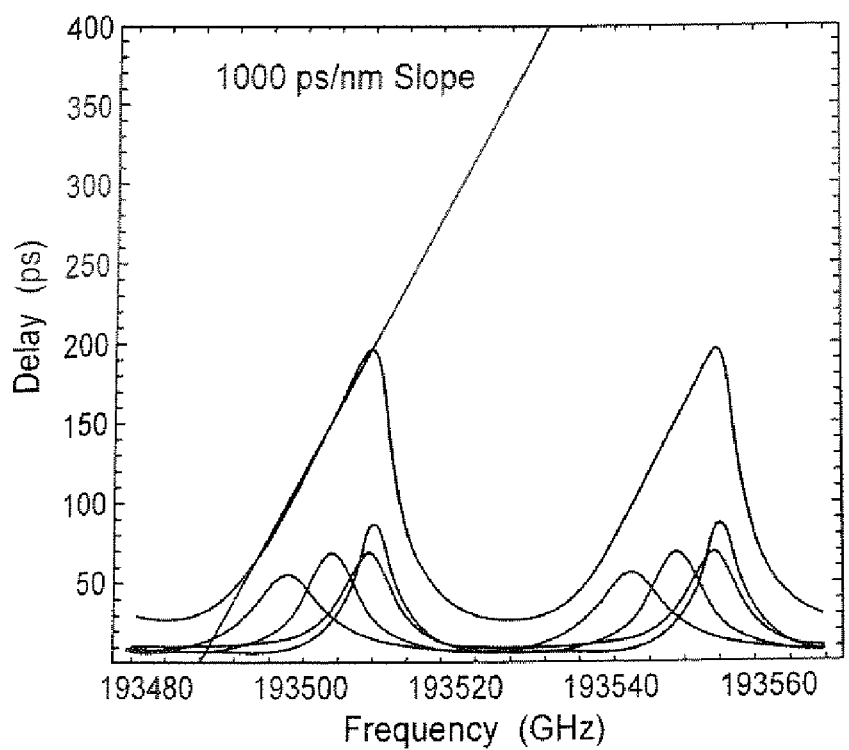

VII. Plots Showing Compensation for Optical Dispersion with Different Dispersion Slopes with First Exemplary ODC Device Design FIGS. 7A-B are plots showing how an ODC device similar to that shown in FIG. 3 having one or more etalons similar to those shown in FIG. 6A with temperature dependent partial reflectivities may compensate for varying amounts of optical dispersion, according to one or more embodiments of the invention. The plots show that an ODC device may be tuned so that group delay curves approximate different lines having different slopes to represent the expected different amounts of optical dispersions that may occur in optical fibers. In the plot on the left the group delay curve approximates a line having a slope of about 2000 ps/nm, whereas in the plot on the right the group delay curve approximates a line having a slope of about 1000 ps/nm. The variable reflectivity allows the FWHM, peak group delay, and wavelength where the peak delay occurs to be varied for etalons so that a different set of curves may be used to achieve a 1000 ps/nm slope than were used for 2000 ps/nm. By way of example, but not limitation, the set of curves for the 1000 ps/nm slope may have smaller peak delays and correspondingly wider FWHM. Not only these but a large number of gradually varying different slopes may be achieved by thermally tuning the etalons over the cyclic period which for silicon optical cavities is about 30° C. The temperatures that achieve a suitable slope may be estimated through simulation and calibrated for an actual device.

VIII. Second Exemplary ODC Device Design

Figure 8A:
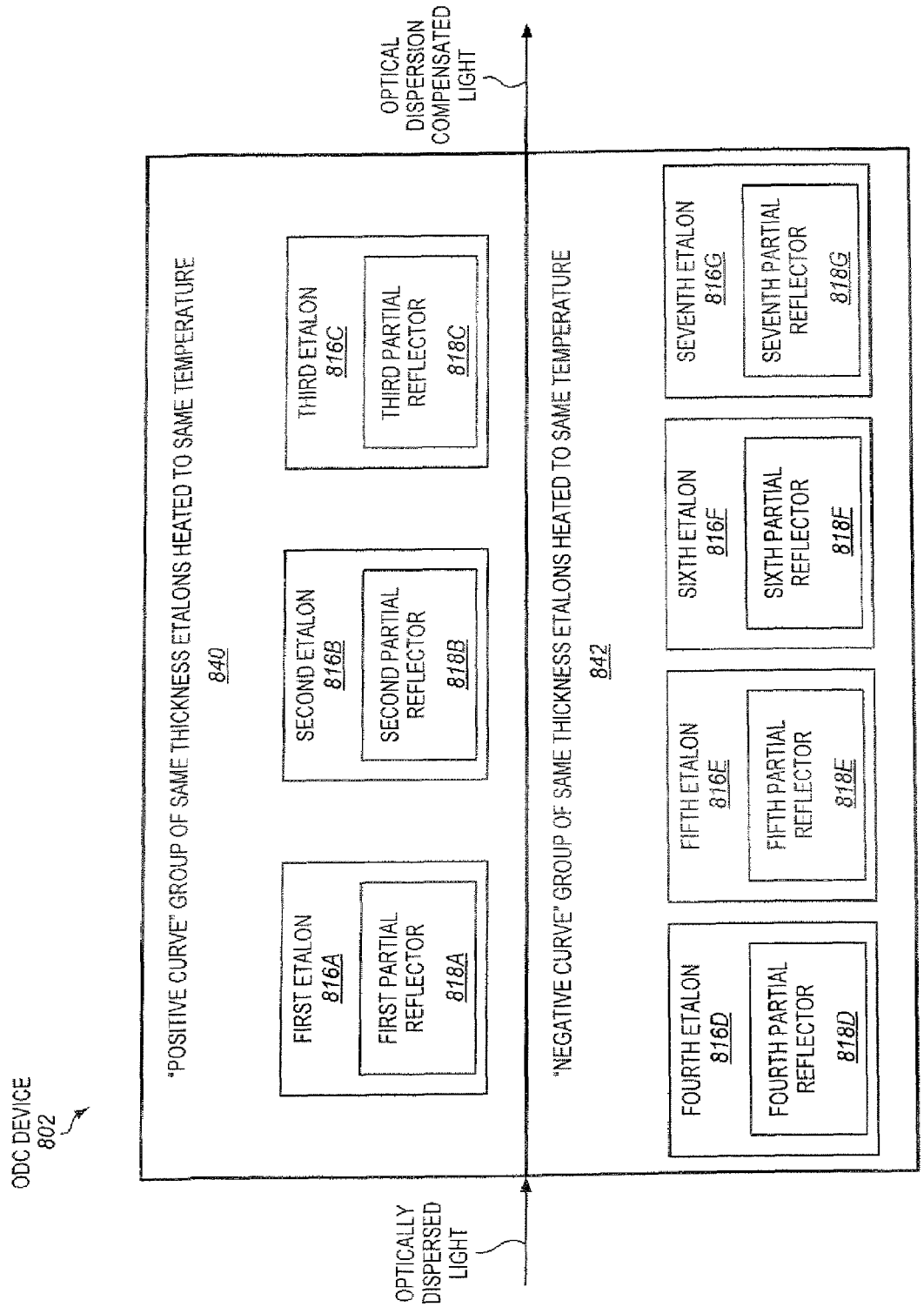
FIG. 8A is a block diagram of an ODC device, according to one or more embodiments of the invention.

FIG. 8A is a block diagram of an ODC device 802, according to one or more embodiments of the invention. The ODC device includes a first so-called "positive curve" group 840 of same or similar thickness etalons that are heated to substantially the same or similar temperature, and a second so-called "negative curve" group 842 of same or similar thickness etalons that are heated to substantially the same or similar temperature. In one or more embodiments of the invention, the etalons may include G-T etalons, although the scope of the invention is not limited in this respect.

The positive curve group includes a first etalon 816A, a second etalon 816B, and a third etalon 816C. The negative curve group includes a fourth etalon 816D, a fifth etalon 816E, a sixth etalon 816F, and a seventh etalon 816G. In alternate embodiments of the invention, fewer or more etalons may optionally be included in either or both of the groups. It is not required that the groups have the same or similar number of etalons. The etalons may optionally have some or all of the characteristics of the etalons discussed elsewhere herein. For brevity, and to avoid obscuring the description, the discussion tends to emphasize different and/or additional characteristics The etalons of the positive and negative curve groups are optically coupled with one another. In one or more embodiments of the invention, alternating etalons of the positive and negative curve groups are optically coupled in series with one another, although this is not required.

The first etalon has a first partial reflector 818A, the second etalon has a second partial reflectivity 818B, and the third etalon has a third partial reflectivity 818C. Likewise, the fourth etalon has a fourth partial reflectivity 818D, the fifth etalon has a fifth partial reflectivity 818E, the sixth etalon has a sixth partial reflectivity 818F, and the seventh etalon has a seventh partial reflectivity 818G.

In one or more embodiments of the invention, etalons having a plurality of different reflectivities and FWHM may be included within each of the positive and negative curve groups. As discussed above, reflectivities may be made different by using reflectors having different materials, different thicknesses, or different numbers of stacked layers, to name just a few examples. Etalons with different reflectivities may have different delay response curves characterized by different peak delays and different FWHM. As will be explained in further detail below, in one or more embodiments of the invention, the different reflectivities may be selected to provide a group delay curve (the sum of the delay curves of the etalons within a group) having a substantially parabolic shape, although the scope of the invention is not so limited.

In one or more embodiments of the invention, the etalons of the positive curve group may be heated together to substantially the same or similar temperatures. Likewise, in such embodiments, the etalons of the negative curve group may be heated together to substantially the same or similar temperatures. As used herein, unless specified otherwise, temperatures of etalons are substantially the same when they are within 1° C. of one another. Controlling only two temperatures or less may offer certain advantages in some embodiments over controlling more temperatures. Different approaches for heating the etalons will be discussed further below.

Other aspects of the design of the etalons, such as, for example, the high reflectors and the optical cavity thicknesses, may optionally be the same or similar, although this is not required. This may potentially help to simplify fabrication. Alternatively, different high reflectors and/or different optical cavity thickness may optionally be used.

Figure 8B:
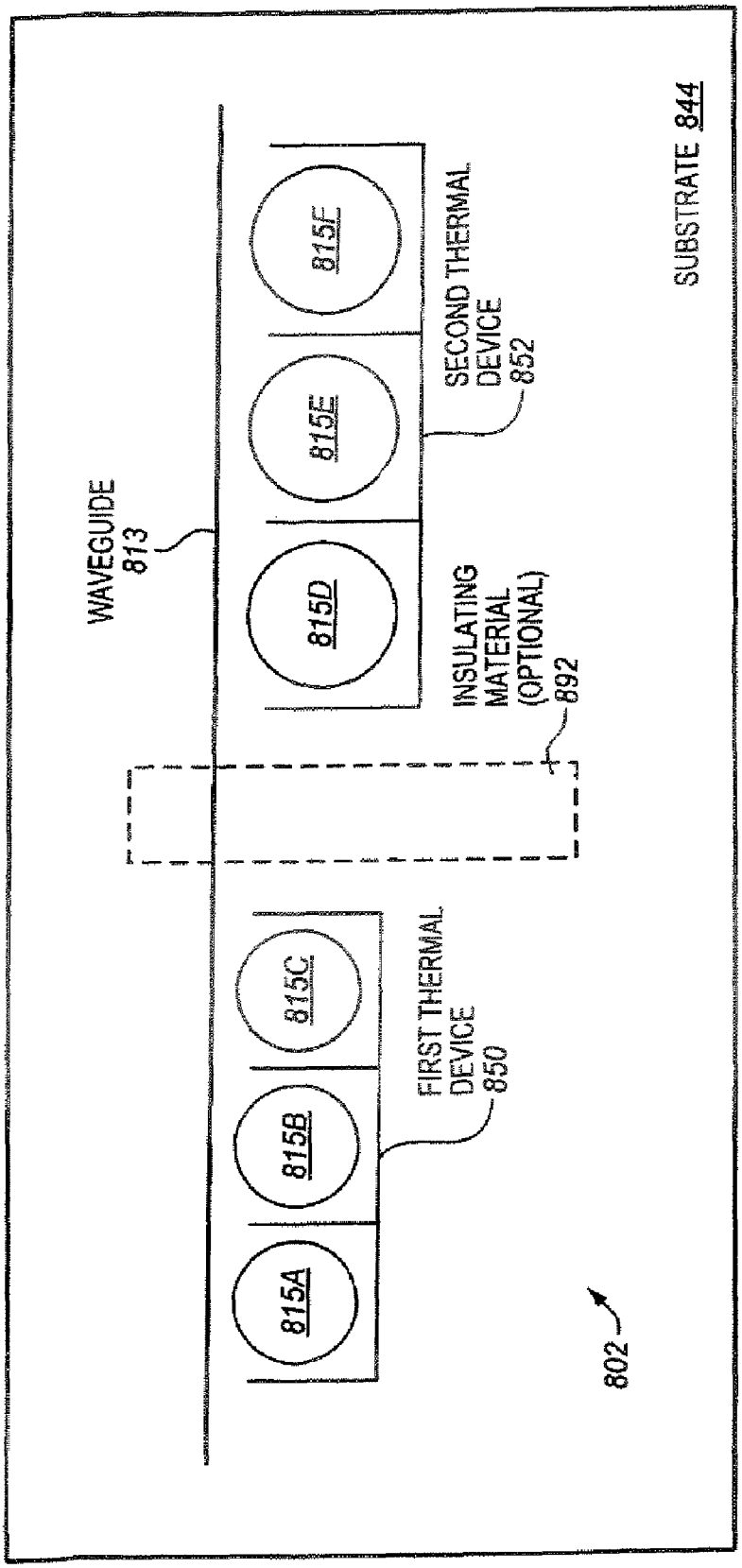
FIG. 8B is a top planar block diagram view of an ODC device including first and second groups of optical ring resonators microfabricated on a substrate, according to one or more embodiments of the invention.

A roughly analogous ODC device is contemplated in which optical ring resonators are used in place of G-T etalons. FIG. 8B is a top planar block diagram view of an ODC device 802 including a first group of optical ring resonators 815A-C and a second group of optical ring resonators 815D-F microfabricated on a substrate 844, according to one or more embodiments of the invention. Each of the optical rings of the first and second groups are optically coupled with an embedded waveguide 813.

A first thermal device 850, such as, for example, a resistive heater, may optionally be microfabricated on the substrate or otherwise monolithically integrated proximate the rings of the first group. Likewise, a second thermal device 852 may optionally be microfabricated on the substrate or otherwise monolithically integrated proximate the rings of the second group. Monolithically integrated temperature sensors (not shown) may optionally be similarly included, although this is not required. An insulating material 892 may optionally be disposed between the rings of the first and second groups to provide improved thermal isolation, although this is not required.

IX. Concrete Example of Second Exemplary ODC Device Design

Figure 9:
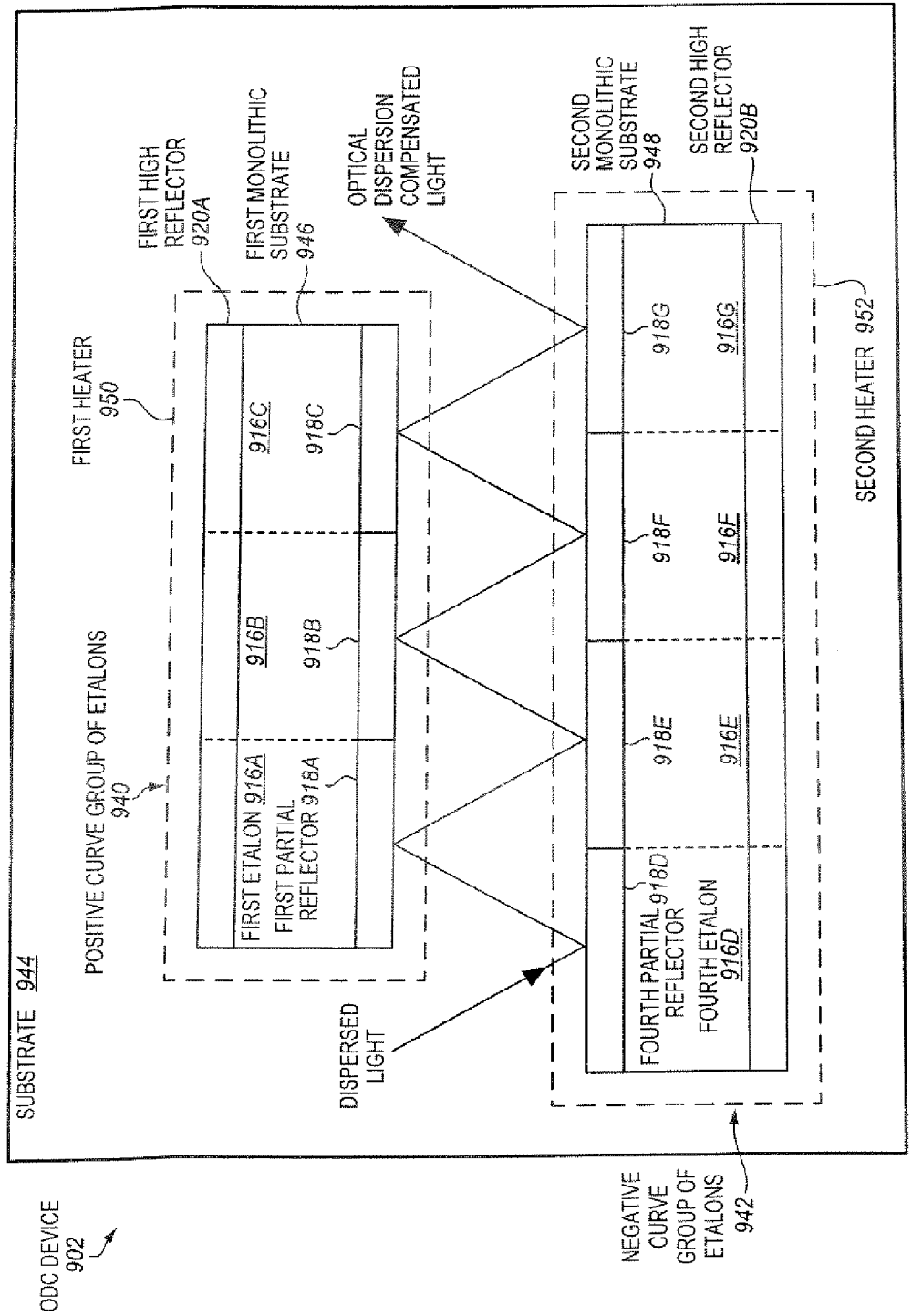
FIG. 9 is a block diagram of a top planar view of an ODC device coupled with a substrate, according to one or more embodiments of the invention.

Referring again to ODC devices based on G-T etalons, FIG. 9 is a block diagram of a top planar view of an ODC device 902 coupled with a substrate 944, according to one or more embodiments of the invention. The ODC device includes a first so-called "positive curve" group of etalons 940 and a second so-called "negative curve" group of etalons 942.

The positive curve group of etalons includes a first etalon 916A, a second etalon 916B, and a third etalon 916C. The negative curve group of etalons includes a fourth etalon 916D, a fifth etalon 916E, and sixth etalon 916F, and a seventh etalon 916G. As discussed, in alternate embodiments of the invention, fewer or more etalons may optionally be included in either or both of the groups. The groups may also optionally have the same or similar number of etalons.

In the illustrated embodiment, the etalons of the positive curve group are monolithically fabricated on a single first monolithic substrate 946. Likewise, the etalons of the negative curve group are monolithically fabricated on a single second monolithic substrate 948. The etalon substrates are shown in cross-section and may be pick-and-placed or otherwise mounted or attached to the larger substrate 944. Once mounted, the etalon substrates may be affixed with any epoxy, solder, or other adhesive. The etalon substrates may be batch fabricated on one wafer and the larger package substrates may be batch fabricated on a different wafer, although alternatively sets of each may be fabricated together on a single wafer. As shown, the etalon substrates may be aligned substantially parallel to one another so that the etalons thereof are in reflective optical communication with one another. In one or more embodiments of the invention, an optically flat spacer may be included between the etalon substrates to improve parallelism, although this is not required. By way of example, the etalon substrates may have dimensions on the order of about one millimeter high by several millimeters wide, although the scope of the invention is not limited to these particular dimensions. For simplicity and clarity of illustration, elements illustrated in the figures of the description have not necessarily been drawn to scale. For example, the dimensions of some of the elements are exaggerated relative to other elements for emphasis or clarity. The devices shown herein may be used in other orientations than those illustrated.

The positive curve group of etalons share a first high reflector 920A, such as, for example, a highly reflective metal layer or dielectric stack, and the single first monolithic substrate, such as, for example, and a polished single crystal silicon substrate. Each etalon of the positive curve group may have a different partial reflector. In particular, the first etalon has a first partial reflector 918A, the second etalon has a second partial reflector 918B, and the third etalon has a third partial reflector 918C.

The negative curve group of etalons share a second high reflector 920B, such as, for example, a highly reflective metal layer or dielectric stack, and the single second monolithic substrate, such as, for example, and a polished single crystal silicon substrate. Each etalon of the negative curve group may have a different partial reflector. In particular, the fourth etalon has a fourth partial reflector 918D, the fifth etalon has a fifth partial reflector 918E, the sixth etalon has a sixth partial reflector 918F, and the seventh etalon has a seventh partial reflector 918G.

In one or more embodiments of the invention, the first and third reflectors may optionally have the same or similar reflectivities and/or FWHM, the fourth and seventh reflectors may optionally have the same or similar reflectivities and/or FWHM, and the fifth and sixth reflectors may optionally have the same or similar reflectivities and/or FWHM. That is, within a group the reflectivities may be symmetrical about the center of the group. However, the scope of the invention is not limited in this respect.

A method of fabricating a group of etalons, according to one or more embodiments of the invention, may include polishing a monolithic substrate, forming a first high reflector on one side of the polished substrate, and forming a plurality of partial reflectors on another opposite side of the polished substrate. A method of forming the partial reflectors, according to one or more embodiments of the invention, may include depositing a resist layer, patterning the resist layer to protect all but an intended location of deposition, depositing one or more layers representing a partial reflector over the intended location of deposition, removing the patterned resist layer, and repeating the operations of depositing the resist, patterning the resist, and depositing the one or more layers representing a partial reflector in order to form the different partial reflectors. However, the scope of the invention is not limited to just this method.

The etalons of the positive and negative curve groups are optically coupled with one another. As shown, the partial reflectors of the positive curve group of etalons may be placed and aligned substantially facing and parallel to the partial reflectors of the negative curve group of etalons. In the illustrated embodiment, alternating etalons of the positive and negative curve groups are optically coupled in series with one another, although this is not required.

Optically dispersed light from a source, such as, for example, an optical fiber and/or collimating lens, may be impacted on the fourth partial reflector of the fourth etalon. The forth etalon may reflect the light to the first etalon. The first etalon may reflect the light to the fifth etalon, the fifth etalon may reflect the light to the second etalon, the second etalon may reflect the light to the sixth etalon, the sixth etalon may reflect the light to the third etalon, the third etalon may reflect the light to the seventh etalon, and the seventh etalon may reflect the light to another destination, such as, for example, a lens and/or light detector device. The etalons may collectively perform optical dispersion compensation on the light so that the light reflected by the seventh etalon may represent optical dispersion compensated light.

The positive curve group of etalons may be heated and/or cooled together as a group in a first heated region 950. Likewise, the negative curve group of etalons may be heated and/or cooled together as a group heated region 952. In this example configuration, one or more or each of the groups may be separately thermo-optically tuned by separately controlling the heating and/or cooling within the regions. To facilitate thermal isolation between the two regions, a thermal barrier or insulator may be included between the regions. Examples of various suitable heaters, such as, for example, resistive heaters, will be discussed in greater detail further below. In one or more alternate embodiments of the invention, coolers, such as, for example, thermo-electric coolers, may optionally be included for one or more of the groups, although this is not required. Passive cooling to ambient is another option.

X. Plots Showing Positive and Negative Group Delay Curves

Figure 10A:
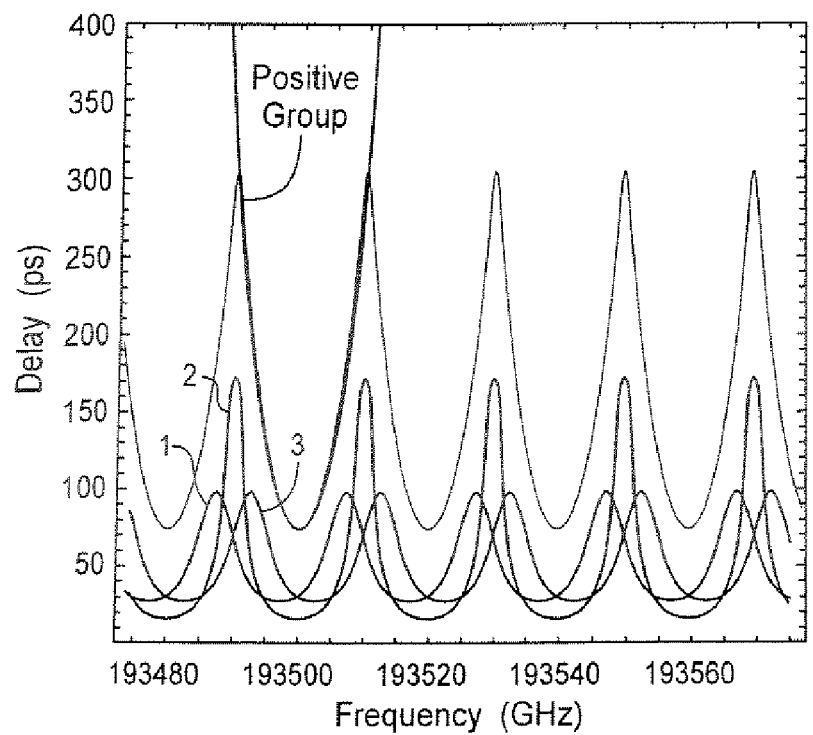
FIG. 10A is a plot showing delay curves for a positive curve group of etalons, according to one or more embodiments of the invention.

FIG. 10A is a plot showing delay curves for the so-called positive curve group of etalons, according to one or more embodiments of the invention. Three different delay curves labeled 1, 2, and 3 respectfully represent a delay versus frequency response curve for the first, second, and third etalons of the positive curve group of etalons. As shown, each of the different delay curves may have a different center frequency or peak delay. That is, the center frequencies or peak delays of the three different delay curves are shifted in frequency. In one or more embodiments of the invention, the shift of the center frequency may be due at least in part to a difference in thickness of a layer that may be used to adjust a phase of light, although this is not required. Other approaches for shifting the frequency are also potentially suitable. As further shown, the curves for the first and third etalons have substantially similar shapes or FWHM and peak delays, although this is not required. In the particular illustrated embodiment, the etalons have an FSR of about 20 GHz, although this is not required. A group delay curve labeled "positive group" representing the sum of the three different delay curves for the first, second, and third etalons of the positive curve group of etalons is also shown. As shown, in one or more embodiments of the invention, the group delay curve for the positive curve group of etalons may have a substantially parabolic shape. The parabola opens upward and is generally convex. The convex parabolic shape is between group delay peaks in the group delay curve, and has a minimum at a frequency of about 193500 GHz.

Figure 10B:
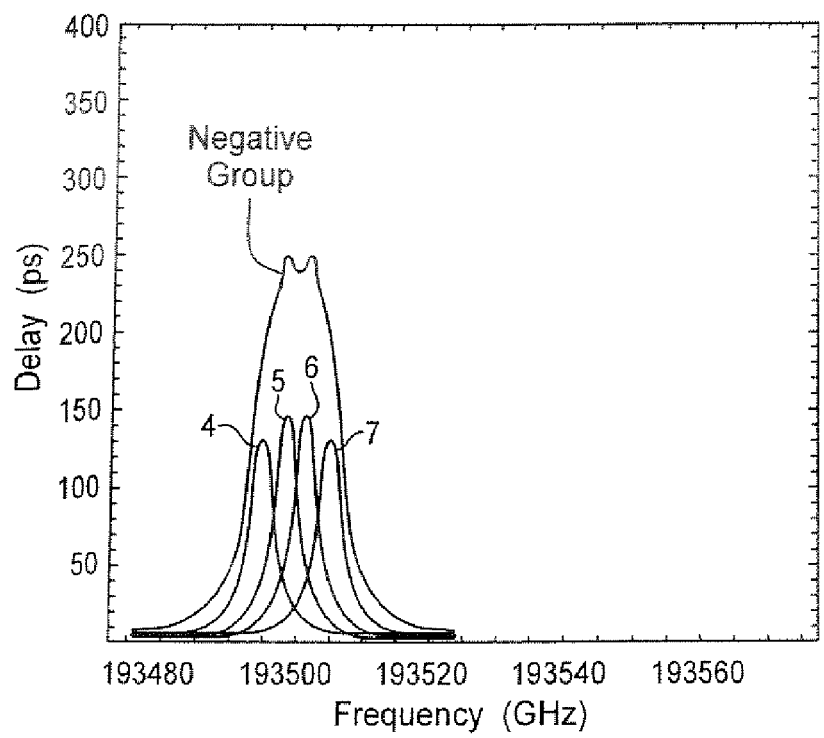
FIG. 10B is a plot showing delay curves for a negative curve group of etalons, according to one or more embodiments of the invention.
Figure 11A:
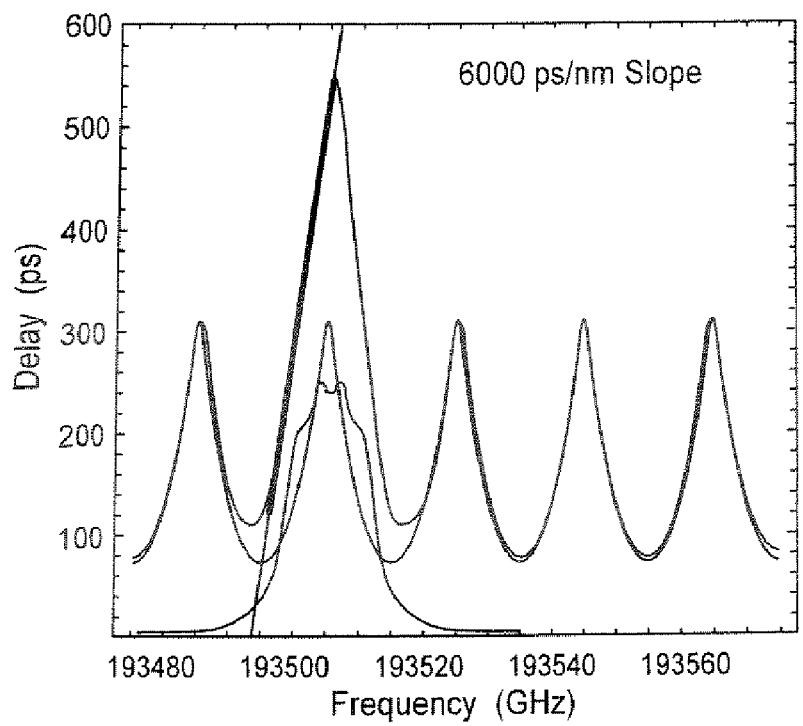
FIGS. 11A-E are plots showing how the positive and negative curves shown in FIGS. 10A-B may be added together for different temperatures for the groups to provide varying levels of optical dispersion correction, according to various embodiments of the invention.
Figure 11B:
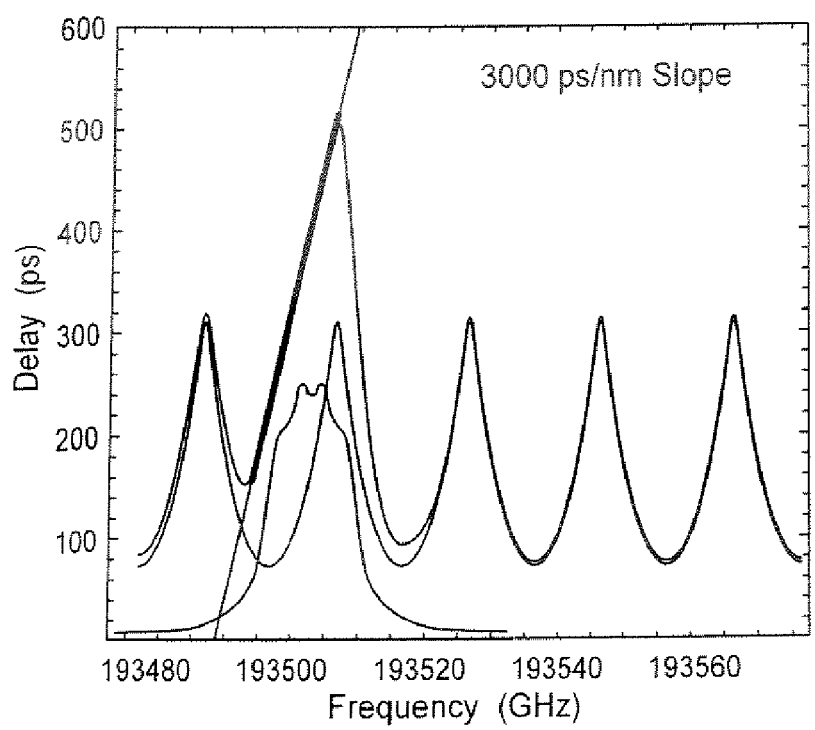
Figure 11C:
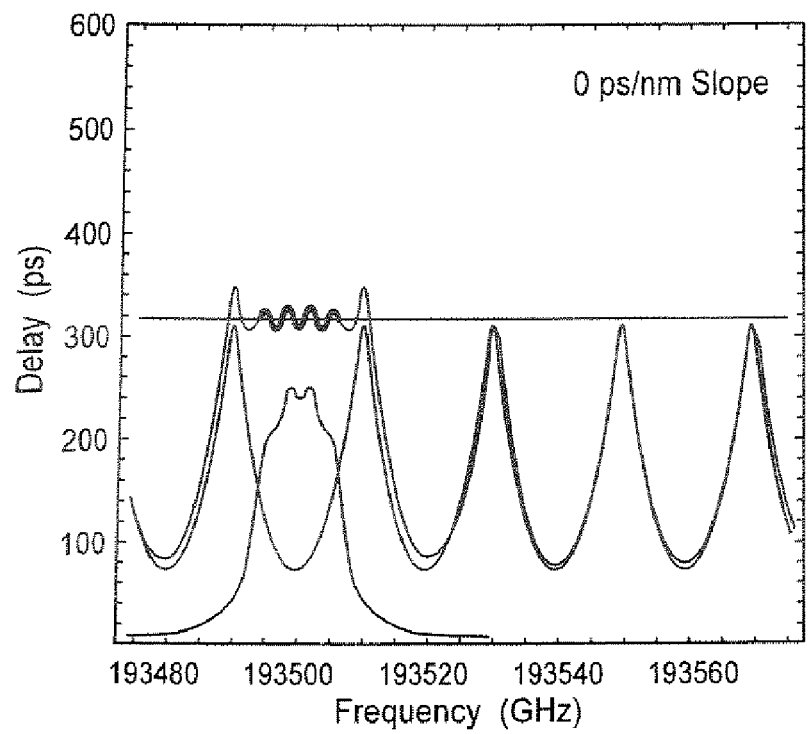
Figure 11D:
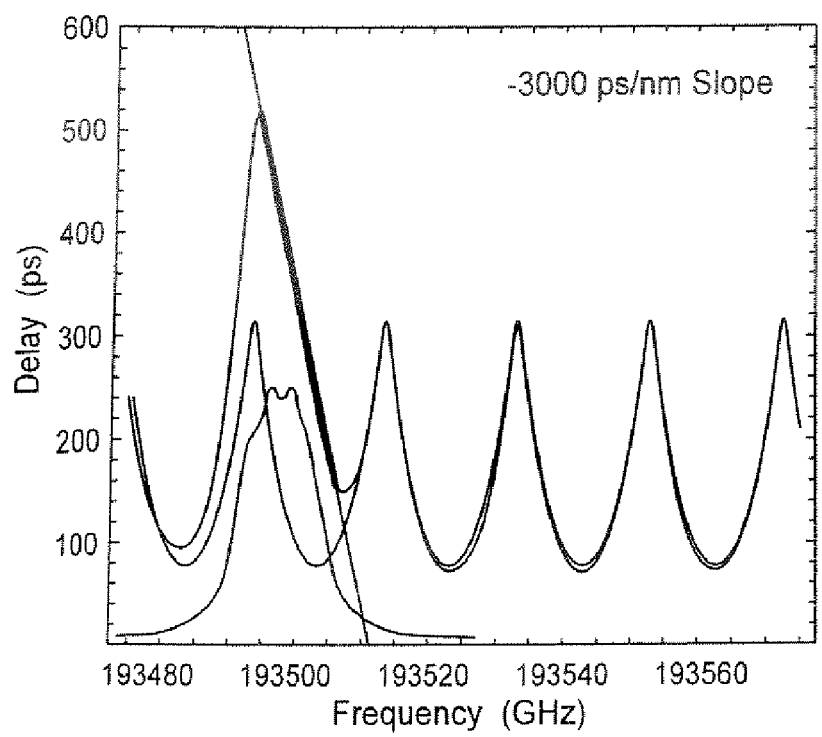
Figure 11E:
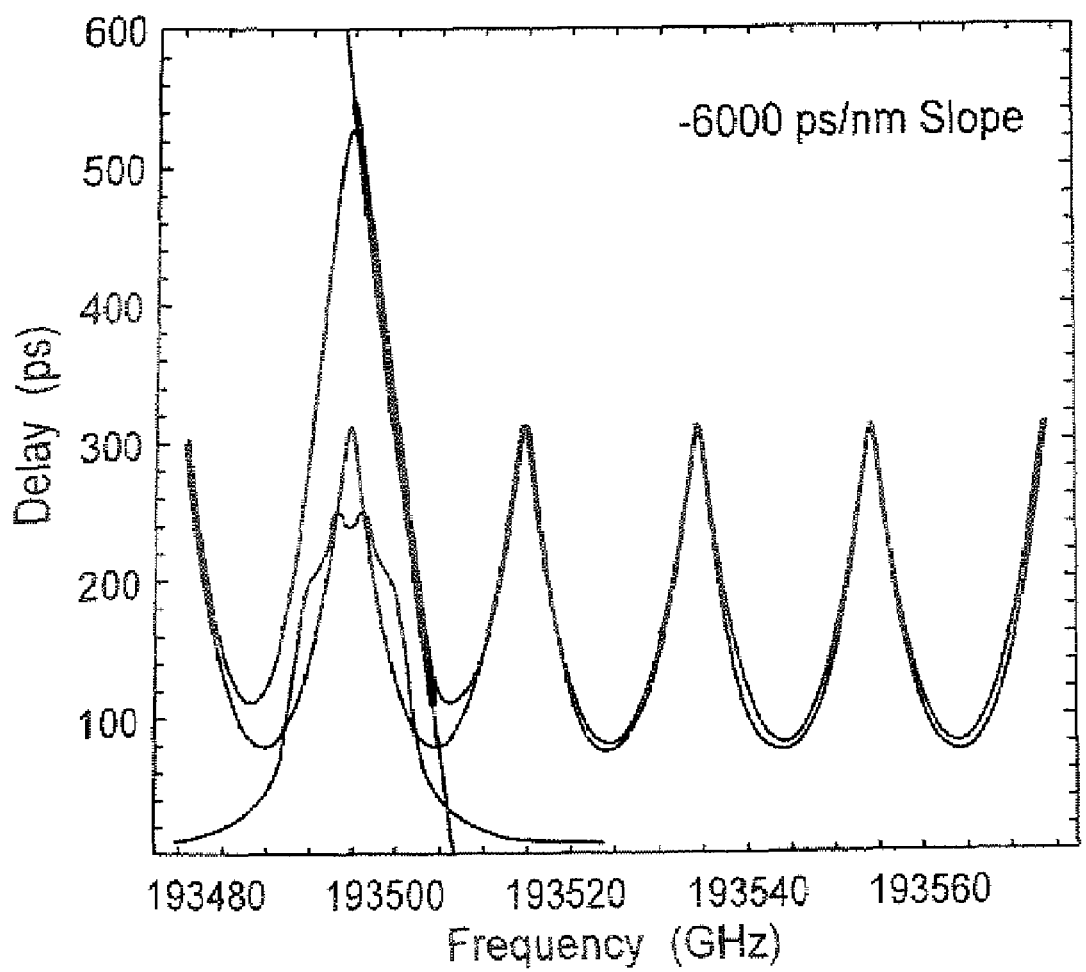

FIG. 10B is a plot showing delay curves for the so-called negative curve group of etalons, according to one or more embodiments of the invention. Four different delay curves labeled 4, 5, 6, and 7 respectfully represent a delay versus frequency response curve for the fourth, fifth, sixth, and seventh etalons of the negative curve group of etalons. As shown, each of the different delay curves may have a different center frequency or peak delay. That is, the center frequencies or peak delays of the three different delay curves are shifted in frequency. In one or more embodiments of the invention, the shift of the center frequency may be due at least in part to a difference in thickness of a layer that may be used to adjust a phase of light, although this is not required. Other approaches for shifting the frequency are also potentially suitable. As further shown, the curves for the fourth and seventh etalons have substantially similar shapes, FWHM, and peak delays, although this is not required. Likewise, the curves for the fifth and sixth etalons have substantially similar shapes, FWHM, and peak delays, although this is not required. In the particular illustrated embodiment, the etalons have an FSR of about 100 GHz, although this is not required. By way of example, a crystalline silicon optical cavity thickness of about 0.4 mm may provide this FSR. A group delay curve labeled "negative group" representing the sum of the four different delay curves for the fourth, fifth, sixth, and seventh etalons of the negative curve group of etalons is also shown. As shown, in one or more embodiments of the invention, the group delay curve for the negative curve group of etalons may have a substantially parabolic shape. The parabola opens downward and may be generally concave. The concave parabolic shape is at group delay peaks in the group delay curve, and has a maximum at a frequency of about 193500 GHz.

XI. Plots Showing Compensation for Optical Dispersion with Different Dispersion Slopes with Second Exemplary ODC Device Design In one or more embodiments of the invention, convex and concave group delay curves, such as, for example, parabolas, may be added together, superimposed, or otherwise combined in order to achieve a straight line or other representation of an amount of optical dispersion compensation that would undo the amount of optical dispersion introduced by an optical fiber. As discussed above, at least to a first approximation, in some optical fibers, the amount of optical dispersion introduced varies approximately linearly with frequency of light. Concave and convex parabolas may be added together or otherwise combined in order to provide quite reasonable approximations to a straight line.

In one or more embodiments of the invention, the slopes of the lines may be modified, or the ODC compensating characteristics of the ODC device modified, by adjusting the temperature of the positive curve group of etalons, the negative curve group of etalons, or both. Adjusting the temperature may include heating, cooling, or both heating and cooling.

For example, heating one group and cooling the other group by the same or similar amount may change the slope without changing the center wavelength. As another example, if all of the groups are heated by the same or similar amount, the center wavelength may be changed without changing the dispersion slope. As yet another example, heating one group but not all of the groups, may change the dispersion slope, and also move the center wavelength (frequency at which the peak delay occurs).

FIGS. 11A-E are plots showing how the positive and negative curves shown in FIGS. 10A-B may be added together for different temperatures for the groups to provide varying levels of optical dispersion correction, according to various embodiments of the invention. FIG. 11A-E respectfully show the positive and negative curves being added together to provide a line having a slope of about 6000 ps/nm, 3000 ps/nm, 0 ps/nm (for example no substantive dispersion correction), −3000 ps/nm, and −6000 ps/nm. Accordingly, multiple group delay curves for multiple different groups of etalons may be added together to represent different amounts and types of optical dispersion.

Each subsequent figure in the sequence going from A, to B, to C, to D, and then to E may differ from the preceding figure by tuning the positive curve by about 2.5 GHz higher in frequency and tuning the negative curve by about 2.5 GHz lower in frequency. For example and not limitation, if the cavities of the positive curve group are fabricated from single crystal silicon, which has a thermo-optic tuning rate of about 10 GHz/° C., then the positive curve group may be cooled by about 0.25° C. to increase the frequency by about 2.5 GHz. If the cavities of the negative curve group are fabricated from crystalline silicon, then the negative curve group of etalons may be heated by about 0.25° C. to decrease the frequency by about 2.5 GHz.

Now, these are just a few examples. The scope of the invention is not limited to just these particular examples. For example, rather than linear relationships, non-linear representations may also optionally be represented or approximated by a combination of group delay curves. As another example, rather than just two group delay curves, three or more group delay curves may be combined. As yet another example, rather than parabolic curves, curves having other shapes may optionally be used. Further modifications and adaptations will be apparent to those skilled in the art and having the benefit of the present disclosure.

XII. Exemplary Heaters and Temperature Sensors

Figure 12:
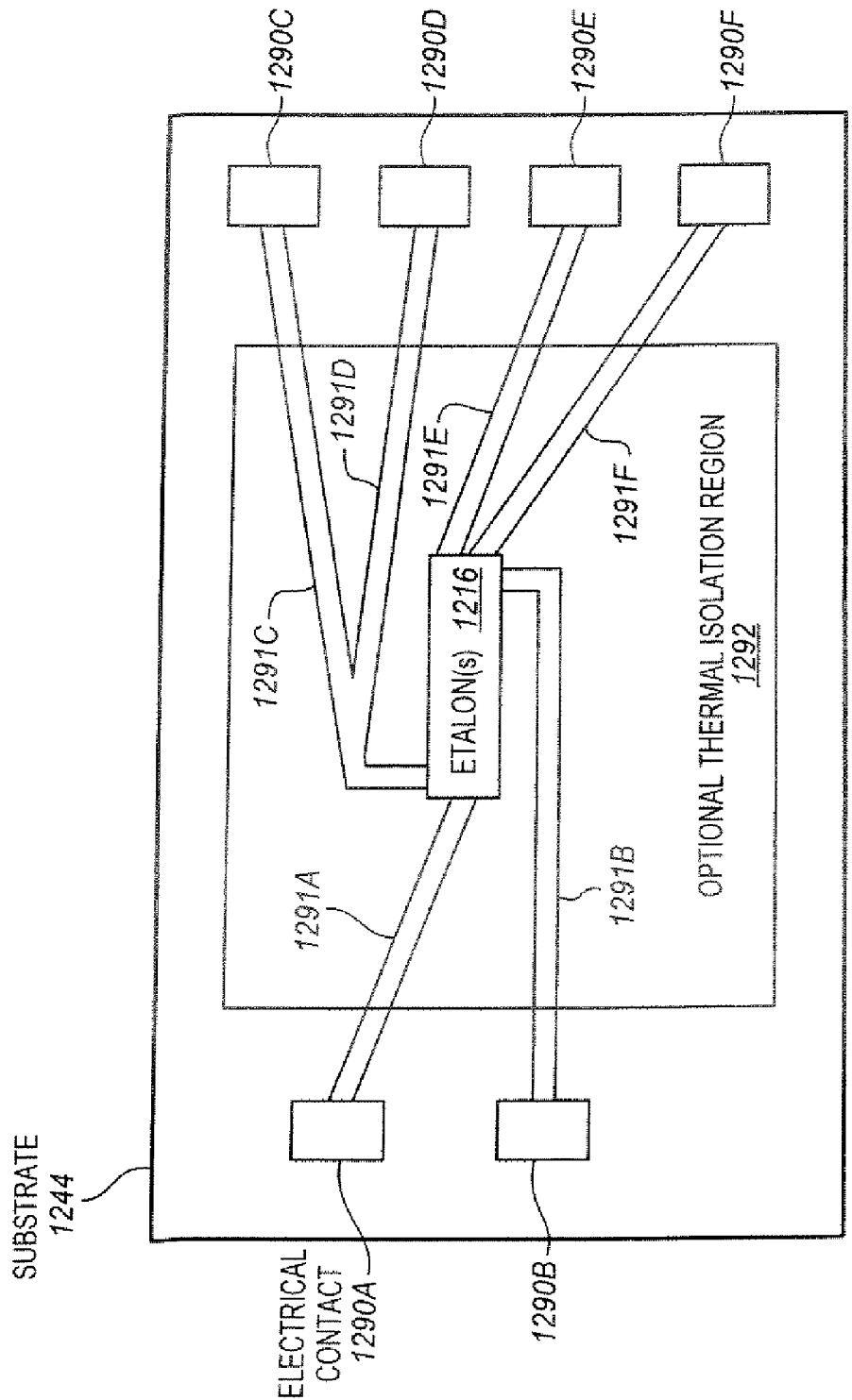
FIG. 12 shows a temperature control and temperature-sensing configuration for one or more etalons, according to one or more embodiments of the invention.

FIG. 12 shows a temperature control and temperature sensing configuration for one or more etalons 1216, according to one or more embodiments of the invention. The one or more etalons are mounted on a substrate 1244. In one aspect, the one or more etalons may include a single etalon. Alternatively, the one or more etalons may include an etalon wafer having a plurality of etalons.

By way of example, the substrate may include a silicon or glass substrate, although this is not required. An optional thermal isolation region, such as, for example, including silicon nitride, or another thermally insulating material, may optionally be included in order to further thermally isolate the one or more etalons, although this is optional and not required. If the substrate includes glass or otherwise sufficiently insulating material, the extra thermal isolation region is generally not needed.

The heating and sensing configuration includes a plurality of electrical contacts 1290A-F, such as, for example, wire bond pads, and a plurality of conductive pathways 1291A-F, such as, for example, metal traces. In one or more embodiments of the invention, the electrical contacts and conductive pathways may be microfabricated as a patterned conductive metal or other layer over the substrate, although this is not required.

In the illustrated embodiment includes a first electrical contact 1290A coupled with a first conductive pathway 1291A, a second electrical contact 1290B coupled with a second conductive pathway 1291B, a third electrical contact 1290C coupled with a third conductive pathway 1291C, a fourth electrical contact 1290D coupled with a fourth conductive pathway 1291D, a fifth electrical contact 1290E coupled with a fifth conductive pathway 1291E, and a sixth electrical contact 1290F coupled with a sixth conductive pathway 1291F. However, the scope of the invention is not limited to the particular illustrated configuration. Fewer or more electrical contacts and/or leads may also optionally be included.

The electrical contacts may be coupled with control logic, such as, for example, via wire bonds. The third through sixth electrical contacts 1290C-F and the third through sixth conductive pathways 1291C-F may be used to monitor temperature of the etalon(s). One pair of electrical contacts, such as, for example, electrical contacts 1290C and 1290F, may be used to carry constant current. Another pair of electrical contacts, such as, for example, electrical contacts 1290D-E, may be used to probe a voltage drop or change. The microfabricated four-wire probe may help to isolate the RTD function from stray series resistance from wire bonding or other sources. The monitored data may be provided to the control logic for purposes of calibration and/or for control of thermo-optic tuning.

Electrical contacts 1290A and 1290B and conductive pathways 1291A and 1292B may be used for temperature control or thermo-optic tuning, such as, for example, heating and/or cooling. In one or more embodiments of the invention, the conductive pathways may be relatively thick, or otherwise include sufficient conductive material, such that not much heat may be generated in these conductive pathways due to resistance except in the immediate local vicinity of the one or more etalons.

Now, as discussed above, in one or more embodiments of the invention, crystalline silicon or another high index material may be included in an optical cavity of a G-T etalon. The relatively large thermo-optic coefficient of crystalline silicon may allow the etalon to be thermo-optically tuned tuning over a relatively small temperature range, such as, for example, of about 30° C. When tuning over such a small temperature range, accurate sensing of the etalon temperature may be beneficial for operation.

Different approaches are contemplated for including temperature control devices and temperature sensors in close proximity of the etalon in order to promote accurate sensing and control of the temperature of the etalon. In one or more embodiments of the invention, a temperature control device, for example a resistive heater and/or thermo-electric cooler, and a temperature sensor may be coupled with the corresponding conductive pathways and positioned directly underneath or otherwise proximate the one or more etalons. As used herein, unless specified otherwise, the temperature control device and temperature sensor are considered proximate an etalon if they are within one millimeter of at least a portion of the etalon. In one or more embodiments of the invention, the temperature control device and the temperature sensor may include lithographically patterned metal structures, such as, for example, of platinum or another suitable metal.

When positioned in such close proximity, the temperature control device may efficiently and rapidly heat and/or cool the etalon(s) and the temperature sensor may accurately sense the temperature of the etalon(s). This may be further promoted if there is direct contact with the etalon(s). Such close proximity and/or contact may also help to reduce the amount of power consumed to heat and/or cool the etalon(s). The optional use of a silicon optical cavity for the etalon may further help to reduce substantial thermal gradients within the etalon, since silicon has a relatively good thermal conductivity. This may help to benefit accurate temperature control of the etalon(s).

Figure 13:
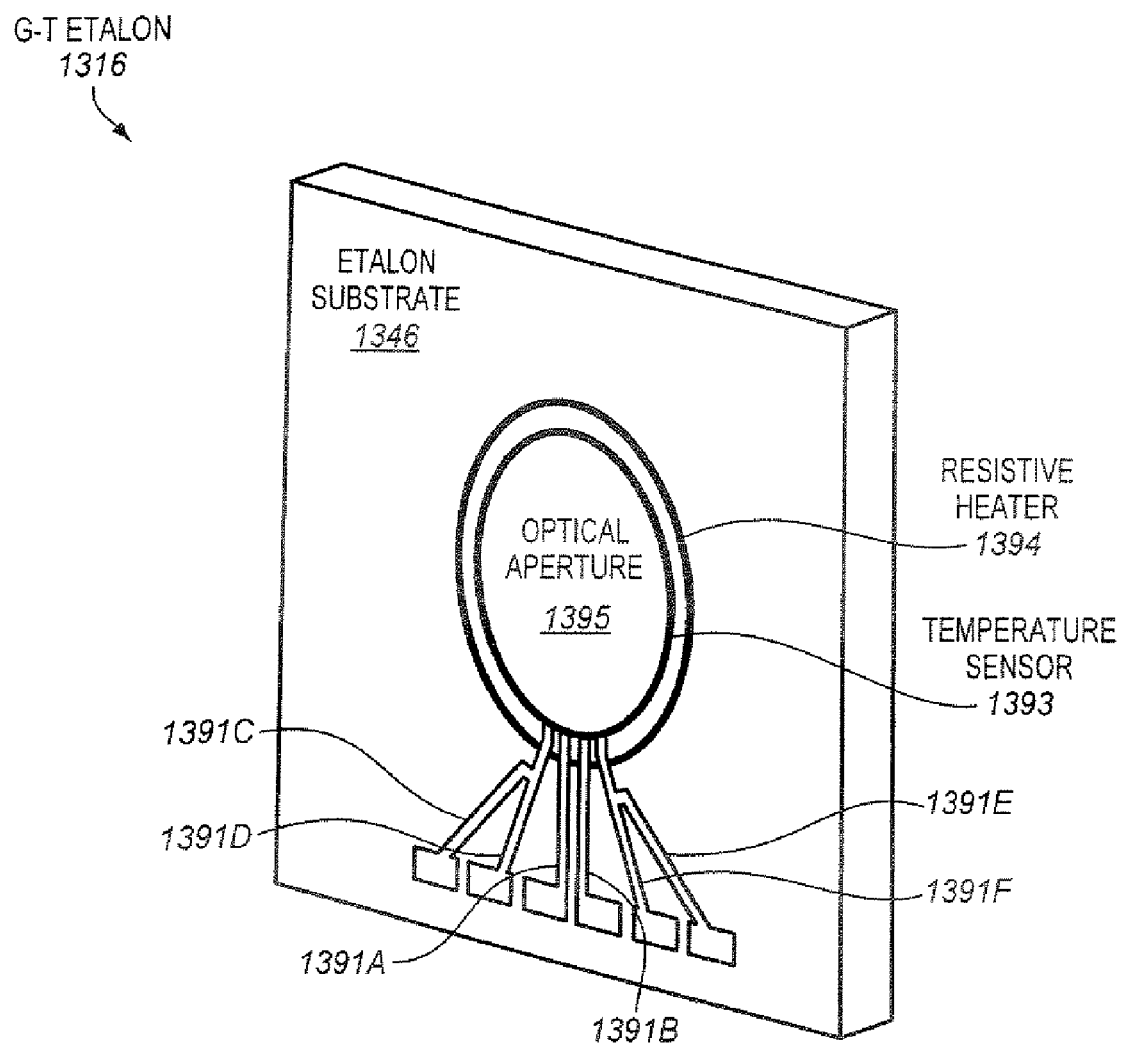
FIG. 13 is a perspective view of a G-T etalon having an integrated resistive heater and an integrated temperature sensor, according to one or more embodiments of the invention.

As another option, in one or more embodiments of the invention, the temperature control device and/or the temperature sensor may optionally be monolithically integrated with the etalon substrate in order to provide further heating efficiency and temperature sensing accuracy, although this is not required. FIG. 13 is a perspective view of a G-T etalon 1316 having an integrated resistive heater 1394 and an integrated temperature sensor 1393, according to one or more embodiments of the invention. In an alternate embodiment of the invention, the G-T etalon may optionally include an integrated thermo-electric cooler or other cooling device, or both an integrated cooling device and an integrated heating device.

The etalon may be microfabricated in an etalon substrate. The etalon has an optical aperture 1395 that may be used to delay light of certain frequencies, as described elsewhere herein. In one or more embodiments of the invention, the etalon may include a single crystal silicon optical cavity, although this is not required. The high thermal conductivity of silicon may tend to reduce thermal gradients in the etalon.

The temperature sensor may be microfabricated or otherwise monolithically integrated optionally in close proximity of the optical aperture. As used herein they are proximate if they are within two millimeters. In particular, the temperature sensor may include a microfabricated metal line or trace around at least a portion of the periphery of the optical aperture. In one or more embodiments of the invention, the temperature sensor may include a platinum resistive thermal device (RTD), although this is not required. Platinum may offer a high coefficient of thermal resistance, good chemical stability, and is a relatively heavy element so may have good electromigration tolerance.

In one or more embodiments of the invention, a heater-only design may be used which lacks a cooling device in favor of an ambient passive cooling mechanism. By way of example, in one or more embodiments of the invention, the specified operating temperature range of an optical receiver may be from about −5° C. to 70° C. In such embodiments, the normal operating temperature of the etalon may be about 10° C. to 40° C. higher than the maximum specified operating temperature of the transceiver, such as, for example, about 80° C. to 110° C. This may allow about 10° C. to 40° C. difference between normal etalon operating temperature and ambient, which may allow sufficient cooling to control temperature based on only heating capability with no cooling capability. However, the scope of the invention is not so limited. For example, in an alternate embodiment, a cooling device may optionally be included to actively cool etalons, although this is not required.

XIII. Package Design

Figure 14:
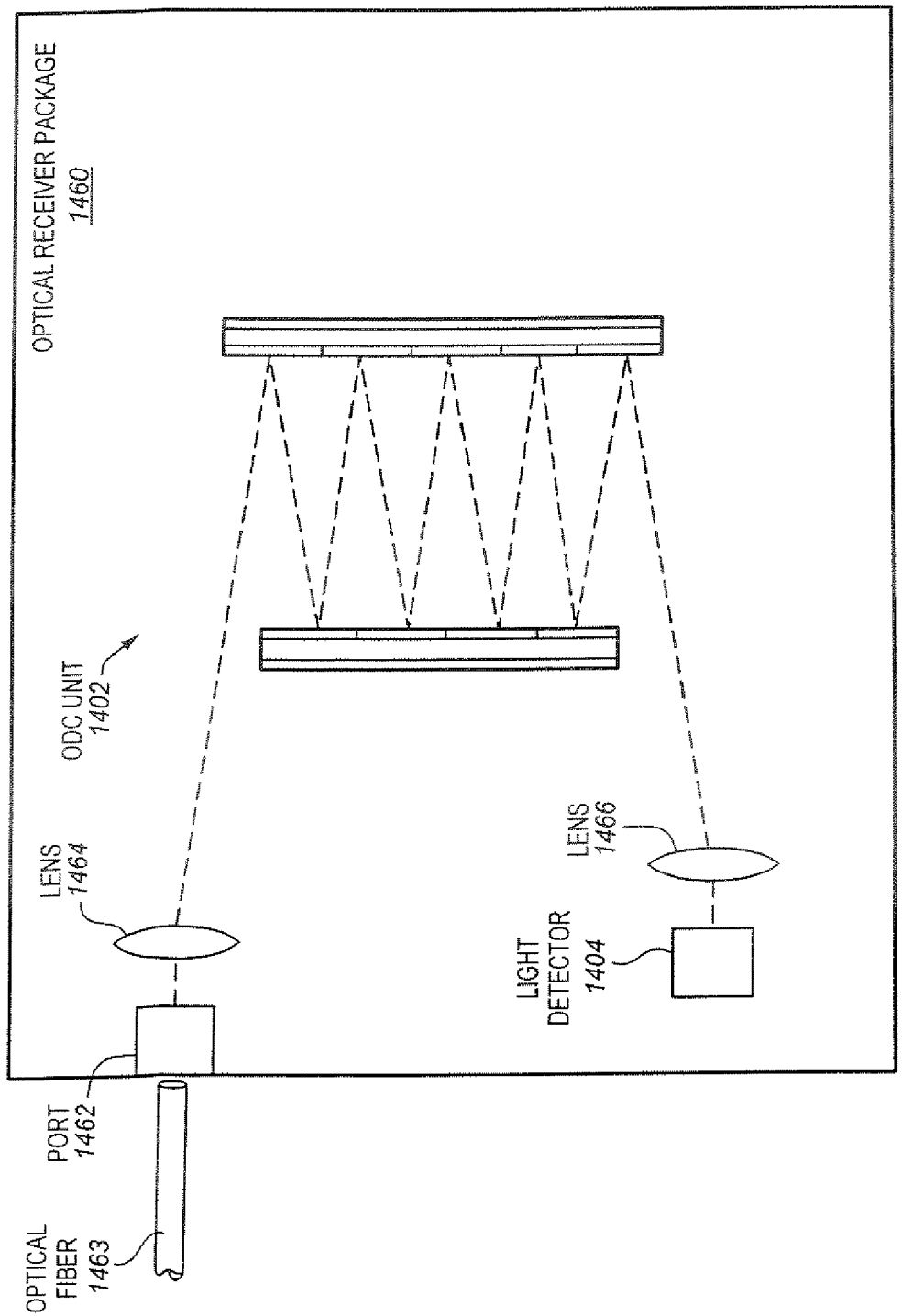
FIG. 14 is a block diagram of a top planar view of an optical receiver package, according to one or more embodiments of the invention.

FIG. 14 is a block diagram of a top planar view of an optical receiver package 1460, according to one or more embodiments of the invention. In one or more embodiments of the invention, the optical receiver package may include a receiver optical sub-assembly (ROSA), although the scope of the invention is not limited in this respect.

The optical receiver package includes a port 1462, a first collimating lens 1464, an ODC device 1402, a second collimating lens 1466, and a light detector device 1404. These components may all be housed within a common housing of the package. In one aspect, the package may include a butterfly package, although the scope of the invention is not limited in this respect.

The port may be capable of being optically coupled with an optical fiber 1463 or other light source. In one or more embodiments of the invention, the optical fiber may include a glass single mode optical fiber, although the scope of the invention is not limited in this respect. Other optical fibers, such as, for example, plastic optical fibers and multimode optical fibers are also potentially suitable. By way of example, the port may include an optical cable receptacle. Light may be provided from the fiber or other light source to the package along an optical path, which is shown in dashed lines.

The first collimating lens is included in the optical path. The collimating lens may collimate the received light. In one aspect, the collimating lens may collimate the light to a diameter of about 300 microns so that the Raleigh range is sufficient to achieve the intended destination, although this is not required. The first collimating lens may focus the light on or otherwise provide the light to the ODC device.

As shown, the optical path may approach the first etalon of the ODC device off-axis or at a non-orthogonal angle so that reflection may occur from one etalon to another. When an etalon is used off axis with a beam of small diameter, the incident angle may be kept small to manage beam interference. A large angle may tend to result in "beam walk off", which may compromise the physical overlap for interference. In one or more embodiments of the invention, the etalons of the ODC device may include crystalline silicon or another relatively high refractive index material having a refractive index greater than that of fused silica glass in their optical path length in order to improve off-axis performance. That is, if silicon is used for the optical path length of the etalons, the light may refract more strongly into the etalon and may propagate within the etalon at a smaller angle to the normal. This effect may be proportional to, or at least directly related to, the index of refraction of the silicon. Additionally, a physically thinner piece of silicon may be used to achieve the same or similar optical thickness. This effect is also proportional to or at least directly related to the index of refraction of the silica. As a result, a silicon etalon with an index of about 3.4 may be tilted about 5 times further than a fused silica etalon with an index of about 1.5 without further compromising performance. This may potentially help to avoid needing to use a beam splitter. Silicon may also similarly tolerate smaller beam diameters.

The ODC device may have features, performance, and design feature flexibility as described elsewhere herein. The last etalon of the ODC device may reflect the optical dispersion compensated light to the second collimating lens, which is positioned in the optical path. In the illustrated embodiment, the second collimating lens is toward the front of the package, or at the end where the light is received, although this is not required. In an alternate embodiment of the invention, the groups of the ODC device may optionally each have the same number of etalons so that the optical signal may be reflected toward the back of the package.

The second collimating lens, which is optional, may help to collimate the light on the light detector device. This may help to provide a tight focus of light on the light detector device, which may allow a smaller and potentially less costly light detector device, although this is not required. The light detector device may convert the received light to one or more corresponding electrical signals that may be processed in conventional ways known in the arts.

XIII. Exemplary Optical Transceiver

Figure 15:
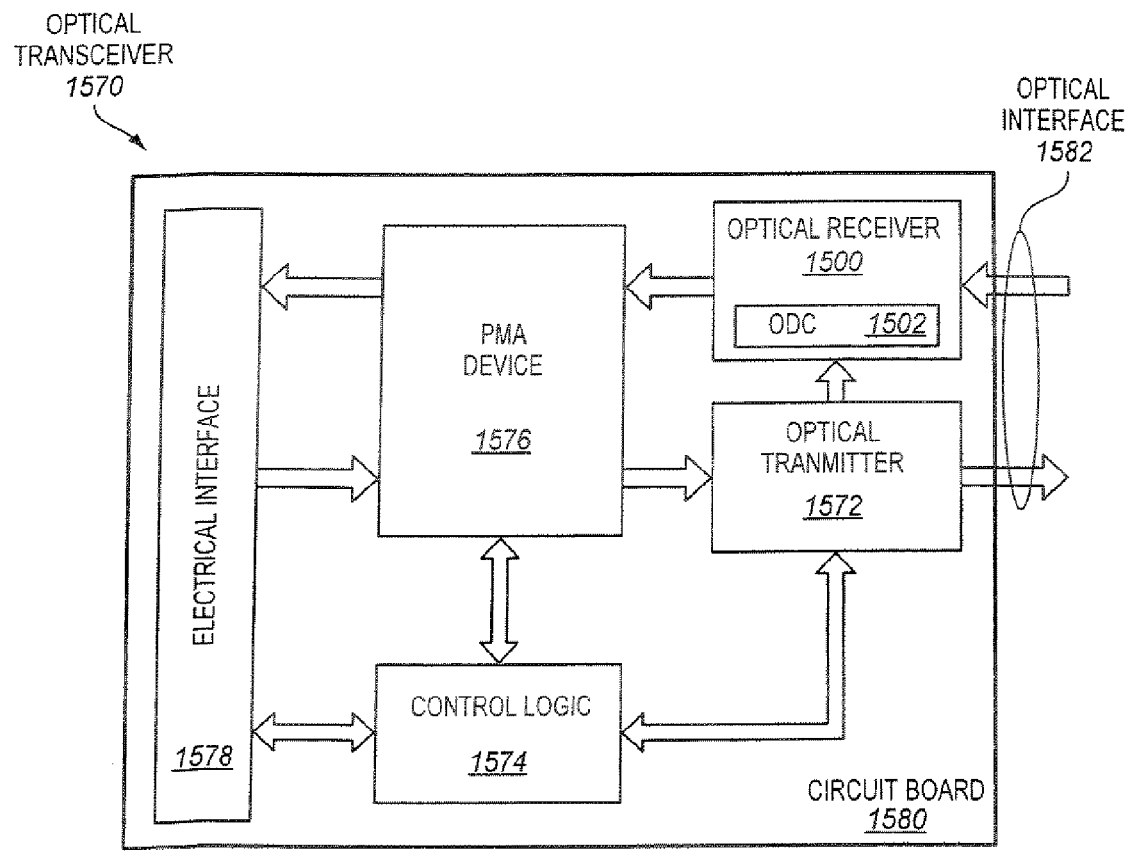
FIG. 15 is a block diagram of an optical transceiver, according to one or more embodiments of the invention.

FIG. 15 is a block diagram of an optical transceiver 1570, according to one or more embodiments of the invention. An optical transceiver is sometimes also referred to in the arts as an optical transponder.

The optical transceiver includes an optical receiver, an optical transmitter 1372, control logic 1574, a physical medium attachment (PMA) device 1576, and an electrical interface 1578. These components may be physically and/or electrically coupled with a circuit board 1580 and/or included within a housing.

The optical receiver and optical transmitter together form an optical interface 1582. By way of example, the housing may include receptacles to receive mating terminal ends of optical cables and/or fibers. The cables and/or fibers may communicate data in the form of optical signals to the optical transceiver from an optical network and communicate data from the optical transceiver to the optical network.

In particular, the optical receiver may receive optical signals from the optical network. The optical receiver may convert received optical signals to electrical signals and exchange the electrical signals with the PMA unit. The PMA unit may exchange electrical signals with a host device or other signaling medium of an electronic device in which the optical transceiver is employed by way of the electrical interface. The PMA unit may include various processing capabilities, such as, for example, clock multiplier/multiplexer, and clock and data recover/demultiplexer. The electrical interface may provide input/output data transfer, clocking channels, control and monitoring channels, and DC power and ground, for example. In one or more embodiments of the invention, the optical receiver may include a receiver optical sub-assembly (ROSA), although this is not required.

The optical transmitter may receive electrical signals from the PMA unit and may transmit corresponding optical signals to the optical network. In one or more embodiments of the invention, the optical transmitter may include one or more vertical cavity surface emitting lasers (VCSELs), although other types of light sources may also optionally be used. In one or more embodiments of the invention, the optical transmitter may include a transmitter optical sub-assembly (TOSA), although this is not required.

As shown in the illustrated embodiment, the optical receiver may include an ODC device 1502 as disclosed herein to compensate for optical dispersion in received light. In one or more embodiments of the invention, an ODC device may be co-packaged with an optical receiver in a receiver optical sub-assembly package of an optical transceiver. Space constraints on multi-source agreement (MSA) transceiver form factors may tend to make separately packaged ODC units undesirable. Additionally, optical receiver technology tends to be more universal in usage than optical transmitter technology, which may tend to be relatively more application specific. For example, high performance transponders that may benefit from an ODC unit as described herein often use lithium niobate modulators, which tend to be large enough to inhibit co-packaging with an ODC unit. Alternatively, in one or more embodiments of the invention, the optical transmitter may optionally also or alternatively include an ODC device as disclosed herein. By way of example, the ODC device of the optical transmitter may perform optical dispersion pre-compensation.

The control logic may include a microcontroller or analog hardware, for example. The control logic may set control parameters of the PMA, the optical receiver, and the optical transmitter, which may vary over time, temperature, and the like. Without limitation, to further illustrate certain concepts, specific examples of optical transceivers that are suitable for one or more embodiments of the invention are the TXN13600 optical transceivers available from Intel Corporation, of Santa Clara, Calif., although the scope of the invention is not limited to such optical transceivers. The TXN13600 tunable optical transceivers may provide long reach, such as, for example, in some cases 80 km or more, C-band and L-Band tunable 10 Gbps transceivers suitable for Dense Wavelength Division Multiplexing (DWDM) network applications. By way of example, Intel TXN13600 optical transceivers may each include a lithium niobate Mach-Zehnder or other modulator, microcontroller, MUX (9-bit FIFO)/DeMUX, Clock and Data Recovery (CDR) unit, jitter filter, APD and PIN receiver options, and a temperature-tuned external cavity laser, although the scope of the invention is not limited to these specific components. These components may be housed within a 4.1" L×3.5" W×0.53" H or other form factor device, which may have relatively low power dissipation, such as, for example, less than about 11.5 W power dissipation. In one aspect, the device may include a 300 pin MSA module, although this is not required. The TXN13600 optical transceivers may optionally allow adjustment of the receiver decision threshold to allow sufficient Bit Error Rate (BER) and sufficient signal integrity. These are just one example of suitable optical transceivers. Other types of optical transceivers are also suitable.

XIV. Exemplary Network Equipment

In various embodiments of the invention, the optical transceivers disclosed herein may be included in network equipment. Suitable types of network equipment include, but are not limited to, multi-service provisioning platforms (MSPPs), optical switches, optical routers, cross-connects, optical add-drop multiplexers, and 10 Gbps/OC-192 DWDM devices.

Figure 16:
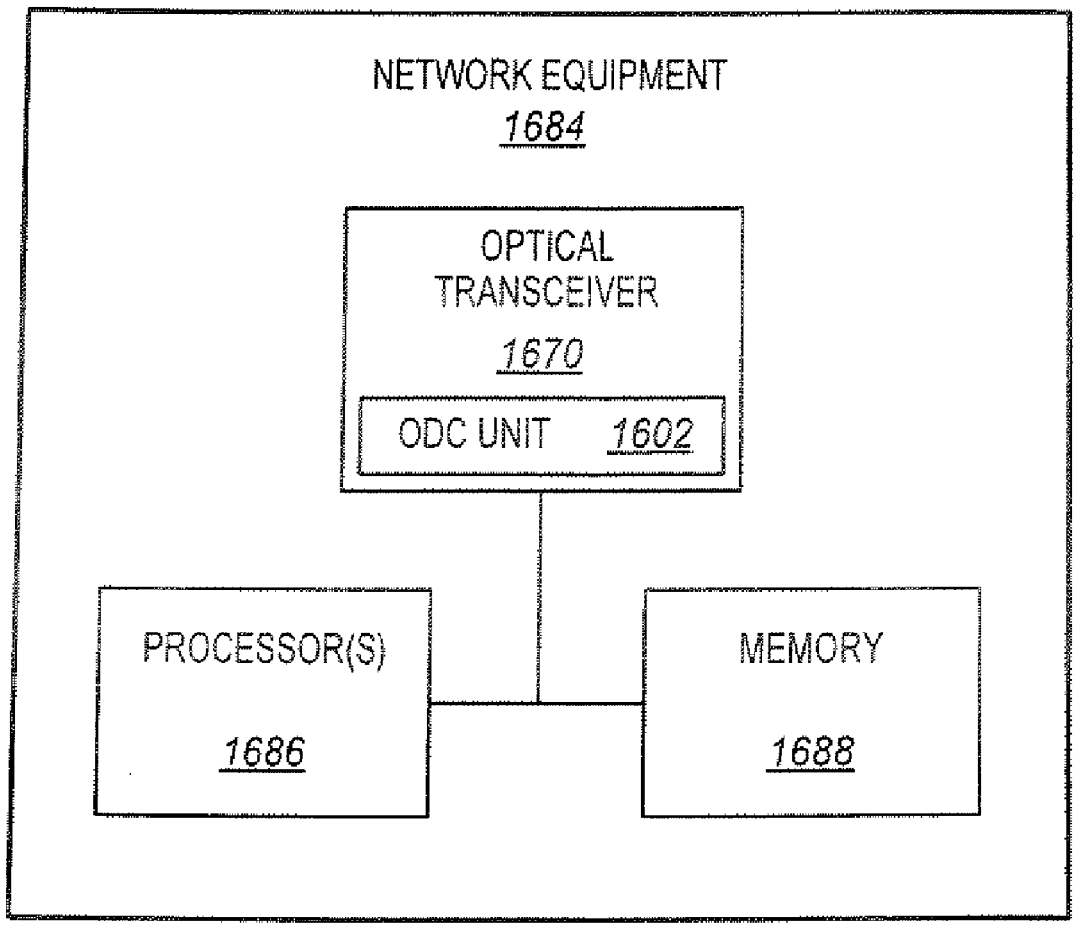
FIG. 16 is a block diagram of network equipment including an optical transceiver including an ODC device, according to one or more embodiments of the invention.

FIG. 16 is a block diagram of network equipment 1684 including an optical transceiver 1670 including an ODC device 1602, according to one or more embodiments of the invention. By way of example, the network equipment may include a router. Alternatively, as another example, the network equipment may include a switch. The switch may include switch fabric.

The network equipment includes one or more processor(s) 1686 and memory 1688. Suitable processors include, but are not limited to, those manufactured by Intel Corporation, of Santa Clara, Calif. The optical transceiver, processor(s), and memory are coupled with, or otherwise in communication with one another, by one or more buses or other interconnects. One type of memory used in some network equipment, but not all network equipment, is dynamic random access memory (DRAM). In one or more embodiments of the invention, the memory may be used to store instructions that may be executed by the one or more processors to operate the network equipment.

XV. Other Matters

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other, for example through an intervening component.

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. Modifications may be made to the embodiments disclosed herein, such as, for example, to the sizes, configurations, functions, materials, and manner of operation of the components of the embodiments. All equivalent relationships to those illustrated in the drawings and described in the specification are encompassed within embodiments of the invention. In other instances, well-known circuits, structures, devices, and operations have been shown in block diagram form or without detail in order to avoid obscuring the understanding of the description.

For clarity, in the claims, any element that does not explicitly state "means for" performing a specified function, or "step for" performing a specified function, is not to be interpreted as a "means" or "step" clause as specified in 35 U.S.C. Section 112, Paragraph 6. In particular, any potential use of "step of" in the claims herein is not intended to invoke the provisions of 35 U.S.C. Section 112, Paragraph 6.

Reference throughout this specification to "one embodiment", "an embodiment", or "one or more embodiments", for example, means that a particular feature may be included in the practice of the invention. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

Accordingly, while the invention has been thoroughly described in terms of several embodiments, those skilled in the art will recognize that the invention is not limited to the particular embodiments described, but may be practiced with modification and alteration within the spirit and scope of the appended claims. The description is thus to be regarded as illustrative instead of limiting.

What is claimed is:

1. An apparatus comprising:
   a substrate;
   a waveguide coupled with the substrate; and
   a plurality of ring resonators optically coupled with the waveguide, the plurality of ring resonators to collectively compensate for optical dispersion in light transmitted through the wave guide by collectively delaying the light transmitted through the waveguide, each of the plurality of ring resonators including a plurality of rings optically coupled together,
   wherein each of the plurality of ring resonators has a different delay curve, and wherein a group delay curve representing a sum of the different delay curves of the plurality of ring resonators is operable to compensate for the optical dispersion.

2. The apparatus of claim 1, wherein each of the plurality of rings optically coupled together includes a first ring that is optically coupled with the waveguide and a second ring that is optically coupled with the first ring, wherein each of the first rings is smaller than each of the second rings.

3. The apparatus of claim 1, wherein a plurality of the ring resonators have different amounts of optical coupling with the waveguide.

4. The apparatus of claim 3, wherein the plurality of the ring resonators that have the different amounts of optical coupling have different separation distances from the waveguide.

5. The apparatus of claim 3, wherein the plurality of the ring resonators that have the different amounts of optical coupling have different coupling lengths with the waveguide.

6. The apparatus of claim 5, wherein one of the ring resonators has a ring that is more elongated than a ring of another of the ring resonators to increase a coupling length with the waveguide.

7. The apparatus of claim 1, wherein at least one of the ring resonators has a temperature dependent coupling with the waveguide.

8. The apparatus of claim 7, wherein said at least one of the ring resonators has a temperature dependent effective coupling coefficient with the waveguide.

9. The apparatus of claim 1, further comprising a thermal device to change a temperature of a ring resonator of the plurality of ring resonators.

10. The apparatus of claim 9, wherein the thermal device comprises a monolithically integrated resistive heater.

11. The apparatus of claim 10, wherein at least a portion of the monolithically integrated resistive heater conforms in shape to a ring.

12. The apparatus of claim 9, further comprising a temperature sensor to sense a temperature of the ring resonator.

13. The apparatus of claim 12, wherein the temperature sensor comprises a monolithically integrated temperature sensor, and wherein at least a portion of the monolithically integrated temperature sensor conforms in shape to a ring.

14. The apparatus of claim 9, further comprising a controller to control the thermal device based, at least in part, on an error detected by reception processing logic.

15. The apparatus of claim 1, wherein the different delay curves of the plurality of ring resonators combine to form a linear shape of the group delay curve which is operable to compensate for the optical dispersion.

16. An apparatus comprising:

a substrate;

a wave guide coupled with the substrate; and a plurality of ring resonators optically coupled with the waveguide, the plurality of ring resonators to collectively compensate for optical dispersion in light transmitted through the waveguide by collectively delaying the light transmitted through the waveguide, each of the plurality of ring resonators including a plurality of rings optically coupled together, a first thermal device to change a temperature of a first group of the plurality of ring resonators and a second thermal device to change a temperature of a second group of the plurality of ring resonators.

17. The apparatus of claim 16, wherein the first group comprises a positive curve group whose delay curves add to a positive curve, and wherein the second group comprises a negative curve group whose delay curves add to a negative curve.

18. A method comprising:

detecting optical dispersion in an optical signal;

changing a temperature of a plurality of ring resonators that each include a plurality of rings coupled together, wherein the temperature of the plurality of ring resonators is changed based at least in part on the optical dispersion detected in the optical signal;

changing coupling coefficients of the plurality of ring resonators with a waveguide through which the optical signal is transmitted based on the change in the temperature; and compensating for the optical dispersion by collectively delaying light with the plurality of ring resonators that each include a plurality of rings coupled together, wherein each of the plurality of ring resonators has a different delay curve, and wherein a group delay curve representing a sum of the different delay curves of the plurality of ring resonators is operable to compensate for the optical dispersion.

* * * * *